US009258622B2

(12) United States Patent
Youenn et al.

(10) Patent No.: US 9,258,622 B2
(45) Date of Patent: Feb. 9, 2016

(54) METHOD OF ACCESSING A SPATIO-TEMPORAL PART OF A VIDEO SEQUENCE OF IMAGES

(75) Inventors: Fablet Youenn, La Dominelais (FR); Denoual Franck, Saint Domineuc (FR)

(73) Assignee: Canon Kabushiki Kaisha, Tokyo (JP)

(*) Notice: Subject to any disclaimer, the term of this patent is extended or adjusted under 35 U.S.C. 154(b) by 323 days.

(21) Appl. No.: 13/094,778

(22) Filed: Apr. 26, 2011

(65) Prior Publication Data
US 2011/0305278 A1 Dec. 15, 2011

(30) Foreign Application Priority Data

Apr. 28, 2010 (FR) ...................................... 10 53273

(51) Int. Cl.
*H04N 21/6375* (2011.01)
*H04N 21/2343* (2011.01)
(Continued)

(52) U.S. Cl.
CPC ....... *H04N 21/6375* (2013.01); *H04N 7/17336* (2013.01); *H04N 19/167* (2014.11); *H04N 21/2343* (2013.01); *H04N 21/2387* (2013.01); *H04N 21/234345* (2013.01); *H04N 21/234363* (2013.01); *H04N 21/2668* (2013.01);
(Continued)

(58) Field of Classification Search
CPC .......... H04N 19/167; H04N 21/45455; H04N 21/6373; H04N 21/6375; H04N 12/23412; H04N 21/2387; H04N 21/2343; H04N 21/234345; H04N 21/234318
See application file for complete search history.

(56) References Cited

U.S. PATENT DOCUMENTS 6,026,200 A * 2/2000 Okude ............... H04N 21/4425
375/240.18
6,314,452 B1 * 11/2001 Dekel .................. H04N 19/647
375/E7.045

(Continued)

FOREIGN PATENT DOCUMENTS

EP          1710719 A1    10/2006
JP     EP 1301038 A1 *  4/2003   ......... H04N 21/2343
WO   WO 2011125051 A1 * 10/2011   ............. H04N 7/173

OTHER PUBLICATIONS

Islam A et al. "JPEG2000 for Wireless Applications", Proceedings of the International Society for optical engineering (SPIE), USA, vol. 5203, Jan. 1, 2003, pp. 255-271, XP002316046, ISSN:0277-786X, DOI: 10.1117/12.512536 * pp. 262-265: Part II. Region-of-Interest Coding in Motion JPEG2000*.

*Primary Examiner* — Dave Czekaj
*Assistant Examiner* — David N Werner
(74) *Attorney, Agent, or Firm* — Canon U.S.A., Inc. IP Division

(57) ABSTRACT

The invention concerns a method and a device for accessing a spatio-temporal part of a video sequence of images compressed using a coding format implementing a prediction.
The method comprises the steps of:
defining a target spatial region corresponding to said spatio-temporal part to access;
obtaining compressed data corresponding to a selection spatial region in at least one image of the video sequence, said selection spatial region including said target spatial region;
obtaining at least one item of updating information for updating the selection spatial region that is provided for selecting compressed data in a following image of the video sequence, said updating information depending on the decoding of the compressed data corresponding to said target spatial region.

23 Claims, 10 Drawing Sheets

(51) Int. Cl.
  *H04N 21/2387* (2011.01)
  *H04N 21/6373* (2011.01)
  *H04N 21/658* (2011.01)
  *H04N 21/4728* (2011.01)
  *H04N 21/2668* (2011.01)
  *H04N 19/167* (2014.01)
  *H04N 7/173* (2011.01)
  *H04N 21/234* (2011.01)
  *H04N 21/4545* (2011.01)

(52) U.S. Cl.
  CPC ....... *H04N21/4728* (2013.01); *H04N 21/6373* (2013.01); *H04N 21/6581* (2013.01); *H04N 21/23412* (2013.01); *H04N 21/234318* (2013.01); *H04N 21/45455* (2013.01)

(56) References Cited

U.S. PATENT DOCUMENTS

| | | | |
|---|---|---|---|
| 6,629,318 B1* | 9/2003 | Radha | H04N 21/23406 348/419.1 |
| 6,643,414 B1* | 11/2003 | Kadono | H04N 7/1675 348/E7.056 |
| 7,200,615 B2* | 4/2007 | Eschbach | G06F 17/211 707/915 |
| 7,738,710 B2* | 6/2010 | Kliorin | H04N 19/48 375/E7.187 |
| 8,290,062 B1* | 10/2012 | Chen | H04N 21/4728 375/240.08 |
| 2002/0021135 A1 | 2/2002 | Li et al. | |
| 2002/0021353 A1* | 2/2002 | DeNies | 348/36 |
| 2004/0179609 A1* | 9/2004 | Takahashi | H04N 19/63 375/240.25 |
| 2006/0062478 A1 | 3/2006 | Cetin | |
| 2006/0215753 A1* | 9/2006 | Lee | H04N 7/147 375/240.08 |
| 2009/0300701 A1 | 12/2009 | Karaoguz | |
| 2010/0058099 A1* | 3/2010 | Shumarayev | H03K 19/17744 713/400 |
| 2011/0141312 A1* | 6/2011 | Heminghous | H04N 21/21805 348/231.5 |
| 2011/0145256 A1* | 6/2011 | Dunkel | H04N 21/21805 707/743 |

* cited by examiner (a)

(b)

(c)

METHOD OF ACCESSING A SPATIO-TEMPORAL PART OF A VIDEO SEQUENCE OF IMAGES

CROSS REFERENCE TO RELATED PATENT APPLICATIONS

This application claims priority to French patent application No. 1053273 filed on 28 Apr. 2010, which is herein incorporated by reference in its entirety.

TECHNICAL FIELD

The present invention concerns a method of accessing a spatio-temporal part of a video sequence of images, as well as an associated device. It applies in particular to the sequences that are compressed according to a coding format implementing prediction mechanisms.

BACKGROUND

Video compression algorithms, such as those standardized by the standardization organizations ITU, ISO, and SMPTE, exploit the spatial and temporal redundancies of the images in order to generate bitstreams of data of smaller size than the original video sequences. Such compressions make the transmission and/or the storage of the video sequences more efficient.

Most of the video compression schemes, such as the MPEG-1, MPEG-2, MPEG-4, H.261, H.263, H.264 or H.265 formats, take advantage of the so-called "temporal" redundancies between several successive images of the same sequence. Thus, most of the images are coded relative to one or more reference images by comparing similar blocks and then coding the prediction error. This prediction is commonly referred to as temporal or "Inter".

In the case of the MPEG-2 format for example, images of I type (I for Intra) are encoded without reference to other images of the sequence. Thus, when all the compressed data of such an image are available, a decoder may decode and display that image immediately. An image of I type thus constitutes a conventional point of access to the video sequence. It is to be noted that, conventionally, these images of I type are presented periodically, with a period of the order of several tenths of a second to a few seconds. In the case of the H.264 format, these images are denoted "IDR" or "SI".

The MPEG-2 format also implements images of P type (prediction on the basis of the last I image) or B (bi-directional prediction on the basis of preceding and following images of P or I type) which are encoded by prediction relative to one or more reference images. The data compressed relative to such images (i.e. data coding the prediction errors) are not sufficient to obtain an image that can be displayed. This is because the data of the reference images which were used at the time of the prediction must be obtained. Images of P type and B type do not therefore constitute efficient points of access to the video sequence.

The temporal prediction mechanism consequently proves to be extremely efficient in terms of compression, but imposes constraints on the video decoders that wish to provide proper reconstruction of the images of the same sequence, in particular by limiting the temporal random access for the compressed video sequence only to the images of I type.

Cumulatively with the exploitation of temporal redundancies, the video coders also take advantage of so-called "spatial" redundancies within the same image. For this, each image is decomposed into spatial units, blocks or macroblocks, and a block may be predicted from one or more of its spatially neighboring blocks, which is commonly referred to as spatial prediction or "Intra" prediction.

This mechanism when applied in particular in the case of the Intra images referred to previously also notably improves the compression of a video sequence. However, dependency between the blocks is introduced, and this complicates the extraction of a spatial part only of the sequence.

To mitigate this drawback, certain coding schemes such as H.264 provide an organization of the blocks into interdependent packets or "slices" of blocks not having spatial dependencies with blocks outside that packet. The organization into packets relies on a technique known as FMO for "Flexible Macroblock Ordering".

These packets are very often signaled by markers enabling a decoder to obtain access thereto without performing decoding and complete reconstruction of the image, and in particular of the blocks which precede them in the image. Each packet or slice thus constitutes a point of "access" to the video sequence or of spatial synchronization on the basis of which the decoder has no difficulty in performing decoding independently of the other packets.

Nevertheless, for these blocks, temporal dependencies may remain if the image is coded with reference to one or more other images. Thus, the accumulation of the temporal and spatial predictions means that generally the extraction of a spatio-temporal part of a video sequence, that is to say a spatial portion during a temporal section of several consecutive images of the sequence, is a complex operation.

The extraction of a spatio-temporal part from a video sequence is therefore these days the subject of extensive developments.

The W3C ("World Wide Web Consortium", an organization producing standards for the Web) is working on the development of a mechanism for addressing temporal segments or spatial regions in resources that are available on the Web such as video sequences, by using in particular URIs ("Uniform Resource Identifiers") making it possible to identify, via a string, a physical or abstract resource.

This mechanism, independently of the format of representation of the resource, is termed "Media Fragments".

The RFC ("Request For Comments") memorandum number 3986 defines a syntax for the URIs, and integrates in particular the concepts of "fragment" and of "queries" or requests. In this context, a fragment is in particular a part, a subset, a view or a representation of a primary resource.

The "Media Fragments" addressing enabling the access to sub-parts of the audio or video stream or within images, by addition of parameters to the request, following the URI address, makes it possible for example to address:
  temporal segments (or "temporal fragments") defined by initial and terminal times: t=00:01:20,00:02:00 identifying the segment from 1 min20 s to 2 min00 s; and/or
  spatial regions (or "spatial fragments") defined by a generally rectangular viewing region: xywh=10, 10, 256, 256 specifying the upper left corner (10, 10), the width (256) and the height (256) of the rectangle; and/or
  substreams (or "track fragments"), for example a particular audio track associated with a video track='audio_fr'; and/or
  passages (or "named fragments") pre-defined via an identifier, a scene of a film for example: id='the_scene_of_the_kiss'.

In addition to the syntax of the fragments/requests for the addressing thereof, the same working group is in course of producing a client-server communication protocol based on the HTTP protocol ("Hyper Text Transfer Protocol") used on the Web.

In particular, the protocol defines the HTTP requests sent by a client wishing to obtain fragments as well as the responses sent by the server responsible for the extraction and for the sending of those fragments. Each HTTP request or associated HTTP response is composed of header information and data information. The header information may be considered as description/signaling information (in particular as to the type of the data exchanged and as to the identity of the data sent back—region finally sent back) whereas the data information correspond to the spatial and/or temporal fragment of the resource requested by the client.

When the requested fragment can be converted into "byte ranges" either because the client has already received a description of the resource before sending his request, or because the server performs an analysis of the resource before sending it, the exchange of fragments is similar to a conventional exchange of data via HTTP, which makes it possible to exploit cache mechanisms and thereby be fully integrated into a Web architecture.

If on the other hand the fragment cannot be converted into one or more byte ranges belonging to the original resource, transcoding is then necessary at the server, and the new resource so created is sent to the client like any other resource.

This addressing mechanism and the associated communication protocol are advantageously flexible in that they are independent from the video format used, from the encoding options of the video sequences and from the capacities available on the servers processing such requests.

Furthermore, the setting up of this addressing mechanism and of the associated communication protocol will eventually make it possible to significantly reduce the quantity of information exchanged between a client requesting parts of a video and a server storing that video and supplying those requested parts.

This is because, if a client only wishes to view a spatial part of a video sequence, he henceforth no longer needs to download the entirety of the video stream, but only the spatial region concerned possibly in a desired temporal interval.

For example, the spatial filtering syntax implemented is extremely simple, consisting in indicating in the request the target spatial region desired, generally in the form of a rectangle defined using four parameters (in pixels or in percentage of the entire image):

hyper text transfer protocol of the world wide web example.org/my_video.mp4#xywh=percent;25,25,50,50 defines the target spatial region centered on the image and whose dimensions are half those of the entire image.

The portion or "fragment" of the video sequence identified here is said to be "spatial" in that it results from spatial filtering of the original video sequence by the indication of a target spatial region. Of course, other filtering criteria (for example temporal) may be added to this request.

This request is received and processed by a server storing the target video sequence. Theoretically, only the desired portion of the video sequence is exchanged between the server and the client. This makes it possible in particular to reduce the transmission time as well as the bandwidth used over the communication network from the server to the client, on account of the reduced number of data transmitted.

However, in practice, the servers storing the video sequences have some difficulty in extracting and sending the desired portion filtered from the video sequence, in particular on account of the access difficulties resulting from the temporal and/or spatial dependencies between blocks.

To be precise, the desired portion can only be extracted alone further to heavy processing at the server, requiring considerable resources. This is for example the case when transcoding mechanisms are implemented. It is also the case when all the links for predictions have been resolved by the server for selecting the exact set of the data blocks relative to the desired portion and to the blocks serving as reference blocks for the prediction.

Such approaches prove to be ill-adapted to direct communications between equipment that has limited resources available, such as camcorders, TV decoders, television sets, mobile telephones, personal digital assistants and the like.

These same difficulties arise for local accesses to a video sequence.

In contrast to the obtainment of only the desired portion, a more economical approach for the server consists of sending the entirety of the video sequence to the requesting client. However, in this case, the processing operations carried out by the client are very heavy, and generally incompatible with its own resources, in particular if it is a case of clients having scarce processing resources such as portable terminals. Furthermore, this approach requires a high network bandwidth to ensure the transmission of the data from the server to the client.

As an addition to these transmission mechanisms, there are methods for compensating for possible data losses suffered during the transmission of those data.

In particular, the publication US 2006/050695 describes a method of streaming video data compressed using prediction mechanisms, which provides an improvement in error resilience.

One of the principles set out relies on the transmission, by the streaming server, of a redundant representation of a reference image, which may possibly be partial, when the latter is subject to transmission errors (loss, corruption).

The method consists in identifying the redundant representations which enable the errors suffered to be made up for. This identification depends on feedback from the user identifying the packets not received. Lastly, the redundant representation of smallest size is the one chosen to be transmitted.

This method is not however suitable where a user wishes to access and obtain a spatial fragment corresponding to a specific spatial region of the video. This is because the method relies on the transmission of the entirety of the video to the user.

Furthermore, the approach regarding the transmission of a redundant representation is purely reactive in that it is directed to correcting erroneous past data (the reference images) which should already have been received. This therefore amounts to processing these data a second time, which leads to a cost increase, both for the server and for the user.

SUMMARY OF THE INVENTION

Embodiments of the present invention aims to mitigate at least one of the drawbacks of the state of the art, in particular to enable the streaming of spatial fragments with reduced processing costs (server and client) and/or transmission costs (network bandwidth).

To that end, a first aspect of the invention concerns a method of accessing a spatio-temporal part of a video sequence of images compressed using a coding format implementing a prediction, comprising a step of defining a target spatial region corresponding to said spatio-temporal part to access, and further comprising the steps of:

obtaining compressed data corresponding to a selection spatial region in at least one image of the video sequence, said selection spatial region including said target spatial region;

obtaining at least one item of updating information for updating the selection spatial region provided for selecting compressed data in a following image of the video sequence, said updating information depending on the decoding of at least the compressed data so obtained which correspond to said target spatial region.

The target spatial region is in particular a sub-part strictly included in the selection spatial region.

Such a method provides efficient access to parts of a video sequence, notably by limiting the errors due to the absence of necessary data, while limiting the processing load for the various equipment and means used, in particular any communication network transmitting the selected compressed data.

This efficiency and this limitation of the workload are obtained by the use of a selection spatial region which includes the target spatial region defined by the user, and by its updating on the basis of the decoding of the obtained compressed data.

This updating makes it possible to take into account possible missing or superfluous data on processing current images to adjust the data to select and transmit on processing following images and by using the updated selection spatial region. This anticipation proves to be efficient given that the successive images are generally relatively similar, and therefore implement resembling predictive coding.

According to an embodiment of the invention, the method comprises the steps of:

decoding said obtained compressed data which correspond to the target spatial region; and classifying spatial units of images of the video sequence, according their utility on said decoding, so as to obtain an item of updating information on the basis of said classifying.

"Useful" means that these spatial units are necessary for the obtainment of the decoded data representing the target spatial region. These operations are in particular carried out at a client terminal decoding the compressed data. In particular, a spatial unit is useful on decoding compressed data corresponding to the target spatial region, when said spatial unit is included in the target spatial region or when said spatial unit comprises reference data used in the predictive coding of said compressed data.

This provision enables a very precise indication to be given of the (useful) regions to integrate into the selection region and of those (non-useful) to exclude from the selection region at the time of said updating of the selection region. The updating is all the more precise thereby.

In particular, said classifying creates a group of selected spatial units which are useful for the decoding of said compressed data corresponding to the target spatial region; a group of selected spatial units which are not useful for the decoding of said compressed data corresponding to the target spatial region; and a group of non-selected spatial units which are useful for the decoding of said compressed data corresponding to the target spatial region. The updating information may be that classifying, which enables the entity updating the selection spatial region to have available a maximum of precise information on the performance of the current selection region.

According to a particular feature, said selection spatial region is defined by a set of sides, for example a rectangle, and the classifying of a spatial unit leads to the updating of at least one parameter for moving a side of the selection spatial region. This may for example be the number of useful spatial units not selected and/or the number of spatial units selected but not useful which affect each of the sides. In this way, the movement of each side of the selection region may be adjusted as each spatial unit is processed. The parameters resulting from the processing of the set of spatial units therefore enable the selection region to be updated. In particular, said updating information comprises the parameters for movement relative to each side of the selection spatial region. Thus, in retrieving this information, the entity in charge of the updating can carry out the position modification of each of the sides of the selection region, without great processing cost. Furthermore, this information has little volume if it is to be transmitted to a server.

According to an embodiment of the invention, the method is implemented in a client terminal of a communication network, and comprises a step of transmitting the updating information from said client terminal to a remote server storing said compressed video sequence, that updating information being in particular classification information or in similar manner being the identification of the non-useful selected spatial units and those that are useful but not selected, such that said server can update said selection spatial region for the selection of compressed data in a following image of the video sequence. In a client-server context, the invention thus makes it possible to share the workloads among the different participants.

In another embodiment, the method comprises the steps of:

storing the obtained compressed data;

identifying spatial units that are non-selected and useful for the decoding of said compressed data corresponding to the target spatial region, so as to form said transmitted updating information;

providing corrections to said decoding of the compressed data corresponding to the target spatial region to compensate for the absence of the identified spatial units in order to display a decoded version of said compressed data;

requesting and receiving, from said remote server, said identified spatial units; and updating the stored compressed data using said received identified spatial units.

In an embodiment of the invention, the method is implemented in a server device of a communication network, and comprises the steps of:

receiving, from a remote client terminal, a request for access to said spatio-temporal part so as to define a target spatial region identified in said request;

sending said obtained compressed data to said remote client terminal;

receiving said updating information from said client terminal; and updating said selection spatial region on the basis of said updating information received.

This configuration is also relative to a client-server context. It also contributes to fair sharing of the workloads between the different participants.

In particular, the method comprises a step of storing, by the server device, a processing history of a plurality of access requests, and said updating of the selection spatial region for a later access request depends on said history. This provision may in particular by applied for video sequences containing abrupt modifications of images, since in this case feedback from the client terminals is not always relevant.

In an embodiment, said obtainment of the compressed data comprises selecting compressed data corresponding to a group of several images, for example a GOP, and the updating information depends on the decoding of the compressed data obtained in those several images. Contrary to an image by image analysis, this provision enables temporal dependencies to be taken into account for updating the selection spatial region.

In particular, the updating information is generated at each new group of images.

According to a particular feature, the obtainment of the compressed data corresponding to an image of said group of images comprises the steps of:
  adjusting the dimensions of the selection spatial region depending on the type of image concerned; and
  selecting the compressed data corresponding to said image, which are included in said adjusted selection spatial region.

In known manner, the image type for an image may reflect the prediction applied at the time of the compression of that image, as is the case, for example, with the MPEG-2 coding format where the types "I", "P" and "B" are identified.

This provision makes it possible in particular to adjust the quantity of compressed data to transmit and to decode, so as ultimately to reduce the workload for the decoder and the bandwidth used in a communication network.

In an embodiment of the invention, said updating information depends on at least one spatial unit that is not selected and is useful for the decoding of said compressed data corresponding to the target spatial region, in particular in that it serves as reference unit in the prediction of those compressed data. A spatial unit may for example be a block of pixels, a macroblock or a slice of macroblocks. The identification of these spatial units is relatively simple for the decoder. Furthermore, as their absence is the principal source of error in the reconstruction of the requested spatio-temporal portion, taking them into account in the updating of the selection spatial region considerably improves the error rate for the following images.

In particular, said updating information depends on at least one spatial unit that is selected and non-useful for the decoding of said compressed data corresponding to the target spatial region, in particular in that it is not used as reference unit in the prediction of those compressed data. The identification of these spatial units remains relatively simple for the decoder. Furthermore, the taking into account of this or those non-useful spatial units may possibly enable the selection spatial region to be updated in a version of smaller size. Thus, the quantity of compressed data processed by the decoder and possibly transmitted over a communication network is reduced.

The combined taking into account of the non-useful spatial units and of the non-selected useful spatial units thus makes it possible to obtain an efficient compromise between the use of the resources of the different means implemented (network, decoder, equipment storing the compressed data, etc.).

As a variant, said updating information depends on an average estimation of movement of the target spatial region between two images. This configuration has the advantage of being simple to implement on the basis of motion vectors present in the decoded data.

In an embodiment of the invention, the method comprises a step of updating said selection spatial region, said updating consisting in identifying a spatial region (for example the smallest region) encompassing a set of non-selected spatial units which are useful for the coding of said compressed data corresponding to the target spatial region. This enables the analysis to be limited solely to the missing blocks, independently of any non-useful blocks. The workload is thus reduced.

According to another feature, the method comprises a step of updating said selection spatial region, said updating comprising a step of reducing said selection spatial region on the basis of an item of congestion information relative to a communication network on which said obtained compressed data are transmitted. This makes it possible to take into account the communication network in determining the data to transmit. To be precise, the transmission of certain useful blocks may lead to the transmission of a large number of non-useful data, needlessly saturating the bandwidth of the network.

In a complementary manner, a second aspect of the invention concerns a device for accessing a spatio-temporal part of a video sequence of images compressed using a coding format implementing a prediction, comprising a means for defining a target spatial region corresponding to said spatio-temporal part to access, and further comprising:
  a means for obtaining compressed data corresponding to a selection spatial region in at least one image of the video sequence, said selection spatial region including said target spatial region;
  a means for obtaining at least one item of updating information for updating the selection spatial region provided for selecting compressed data in a following image of the video sequence, said updating information depending on the decoding of at least the compressed data so obtained which correspond to said target spatial region.

The access device has similar advantages to those of the method set out above, in particular that of providing efficient transmission of spatial fragments of video, while limiting the impact on the means involved in that access, in particular a communication network, a sending server and a decoding client.

Optionally, the device may comprise means relating to the features of the method set out previously, and in particular, means for classifying spatial units in particular by groups, means for updating the selection spatial region in particular by adjustment of each of its sides, sending and/or receiving means, and/or means for selecting compressed data corresponding to the selection spatial region.

A third aspect of the invention concerns an information storage means, possibly totally or partially removable, that is readable by a computer system, comprising instructions for a computer program adapted to implement a method in accordance with the invention when that program is loaded and executed by the computer system.

A fourth aspect of the invention concerns a computer program readable by a microprocessor, comprising portions of software code adapted to implement a method in accordance with the invention, when it is loaded and executed by the microprocessor.

The information storage means and computer program have features and advantages that are analogous to the methods they implement.

BRIEF DESCRIPTION OF THE DRAWINGS

Still other particularities and advantages of the invention will appear in the following description, illustrated by the accompanying drawings, in which.

DETAILED DESCRIPTION OF EMBODIMENTS

Figure 1:
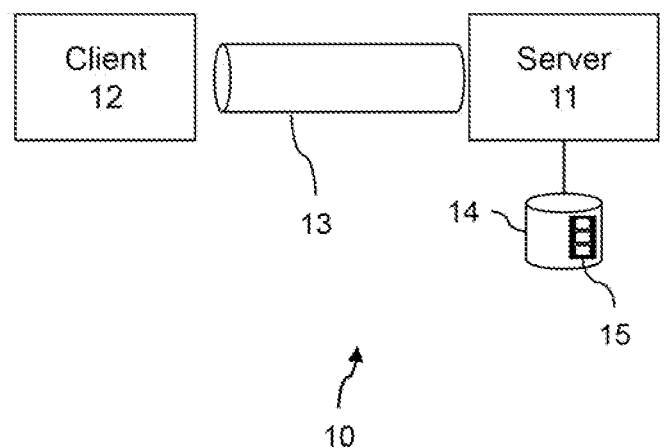
FIG. 1 represents an example of a system for the implementation of the invention.

As represented in FIG. 1, an example of a system 10 for the implementation of embodiments of the invention comprises a server 11 linked to a client terminal 12, via a communication network 13. Other client terminals (not represented) may be connected to the same network 13.

The communication network 13 may be of any nature, wired or wireless, mobile phone based or computer based such as the Internet.

For example, the server 11 may be a web server which a user accesses using a mobile terminal 12 (telephone, personal digital assistant, etc.) or a fixed terminal (computer, television set equipped with Internet access).

In a multimedia application, the server 11 may be merely a fixed video camera or in a network, a portable video camera or a video server.

The server 11 stores, in a multimedia database 14, video sequences 15 that are compressed to reduce the costs of storage and distribution. The video sequences 15 have in particular been compressed using temporal and/or spatial prediction mechanisms.

Figure 2:
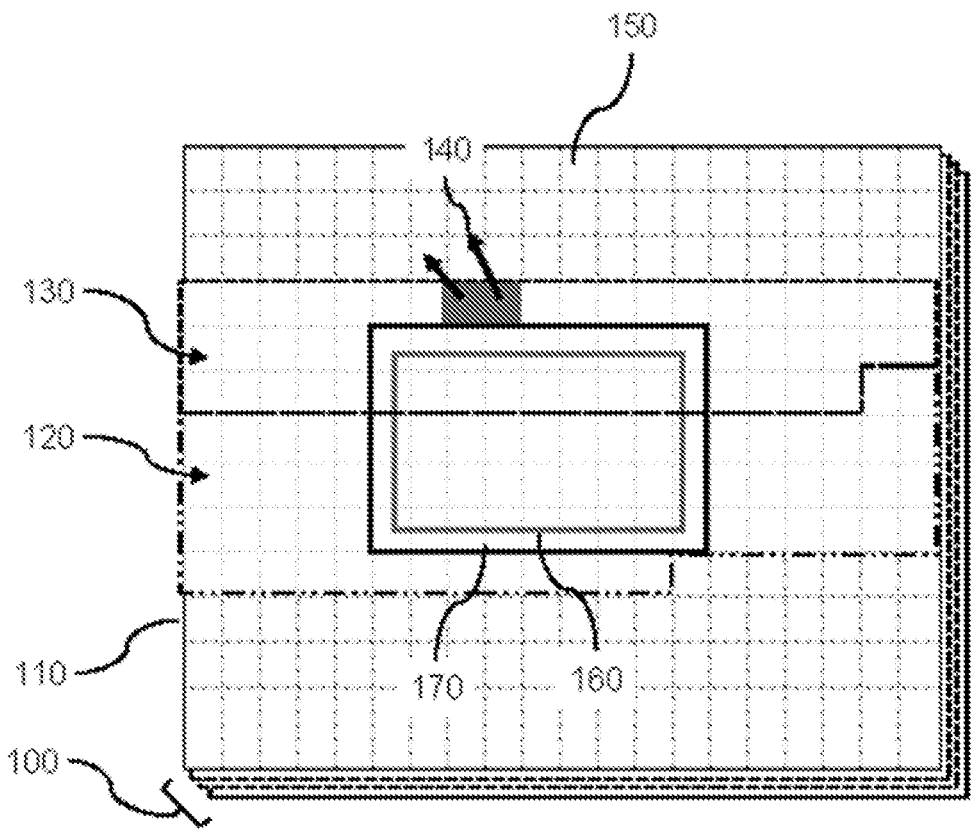
FIG. 2 illustrates the decomposition of an image of a group of images of a video sequence, as well as target and selection spatial regions according to the invention.

FIG. 2 represents a part of a video sequence 15, constituted by a group 100 of images 110, also termed GOP ("Group Of Pictures", a concept well-known to the person skilled in the art).

In conventional manner, each image 110 is composed of a set of pixels (not represented) organized into macroblocks 150, themselves grouped into slices 120 (delimited by the broken line), 130 (delimited by the dotted line).

To obtain the compressed video sequence 15, each macroblock 150 was coded for example by prediction on the basis of reference blocks included either in the same image or in one or more reference images.

The motion vectors 140 are computed for each temporally predicted macroblock and stored in the compressed data 15.

For the Intra prediction, the reference blocks for coding a macroblock 150 are taken in the same slice 120 or 130, such that the macroblocks of a slice are interdependent but independent of blocks belonging to other slices.

In an embodiment, the invention particularly concerns the access, by the client terminal 12, to a spatio-temporal part of the video sequence 15 stored on the server device 11. During this access, a target spatial region or target spatial window 160 spatially delimiting that part to access is defined by a user. This target region corresponds to what the user wishes to view.

Optionally, the user may specify temporal limits of the part to access. The request may be sent to obtain the spatial fragment corresponding to the target region xywh between the times t1 and t2. The target spatial region 160 remains the same for the whole of the desired temporal section [t1, t2]. In the absence of a temporal limit, the video sequence is transmitted according to the defined target region for as long as the user has not terminated his request (for example by closing his viewing application).

In the example of Figure, the target spatial region 160 overlaps slices 120 and 130.

Since generally at least a part of the data of the target spatial region 160 is coded by temporal prediction with reference to macroblocks that are external to slices 120 and 130, the obtainment of the compressed data relative to those two slices proves to be insufficient to perform complete decoding.

In this context, embodiments of the invention provides for using and adapting a selection spatial region or selection spatial window 170, this selection spatial region including the target spatial region 160.

This selection spatial region 170 is for selecting compressed data, both the data to view and the reference data for those to view, in at least one image of the video sequence in order for them to be transmitted to a decoding device.

The adaptation of this selection region 170 according to embodiments of the invention adjusts the quantity of compressed data which is transmitted, with the aim of reaching a compromise between a reduction in that quantity to optimize the use of the network 13 and limit the processing on the client terminal 12, and an increase in that quantity to have sufficient data available to decode, without error, the whole of the target spatial region 160 to view for example. This compromise may also be seen as a compromise between the spatial filtering workloads on the server 11 on one side and on the client terminal 12 on the other side.

The adaptation of the selection spatial region 170 is carried out through updating thereof on the basis of the decoding of the compressed data belonging to said target spatial region which are obtained for at least one image of the sequence. This updating in particular takes into account the usefulness of certain spatial units, such as blocks of pixels, macroblocks or slices, on decoding.

As will be seen below, this adaptation may in particular adjust on the size and on the position of the selection region 170 within the images, it being possible for this selection region 170 to be for example a simple rectangle parallel to the edges of the image or a more complex geometrical shape or be able to based on the boundaries of characteristic sets of pixels of the image (for example a polygon following the boundaries of macroblocks 150 or of slices 120/130). This selection region is preferably strictly included in the image such that, when possible, it is avoided to sent the entirety of the compressed data corresponding to that image. These are then the data corresponding to the slices containing at least a part of the data belonging to the selection region which are sent to the client terminal.

The frequency of updating of the selection spatial region 170 may be from one image to several images or even several times in the same image, and be variable over time. In an embodiment, used the following portion of the description, this updating takes place at each new group of images GOP, which means that a selection spatial region 170 is associated with all the images of a GOP.

The selection spatial region 170 thus adapted may then be applied to select compressed data in a following image of the video sequence.

It turns out that this updated selection spatial region 170 is also effective for that following image due to the coherence which generally links successive images in the video sequences.

Embodiments of the invention thus makes it possible, with less increase in the processing operations for the server and the client terminal, to efficiently obtain the data necessary for the decoding of the desired spatial fragment, without overloading the communication network with non-useful data.

Figure 3:
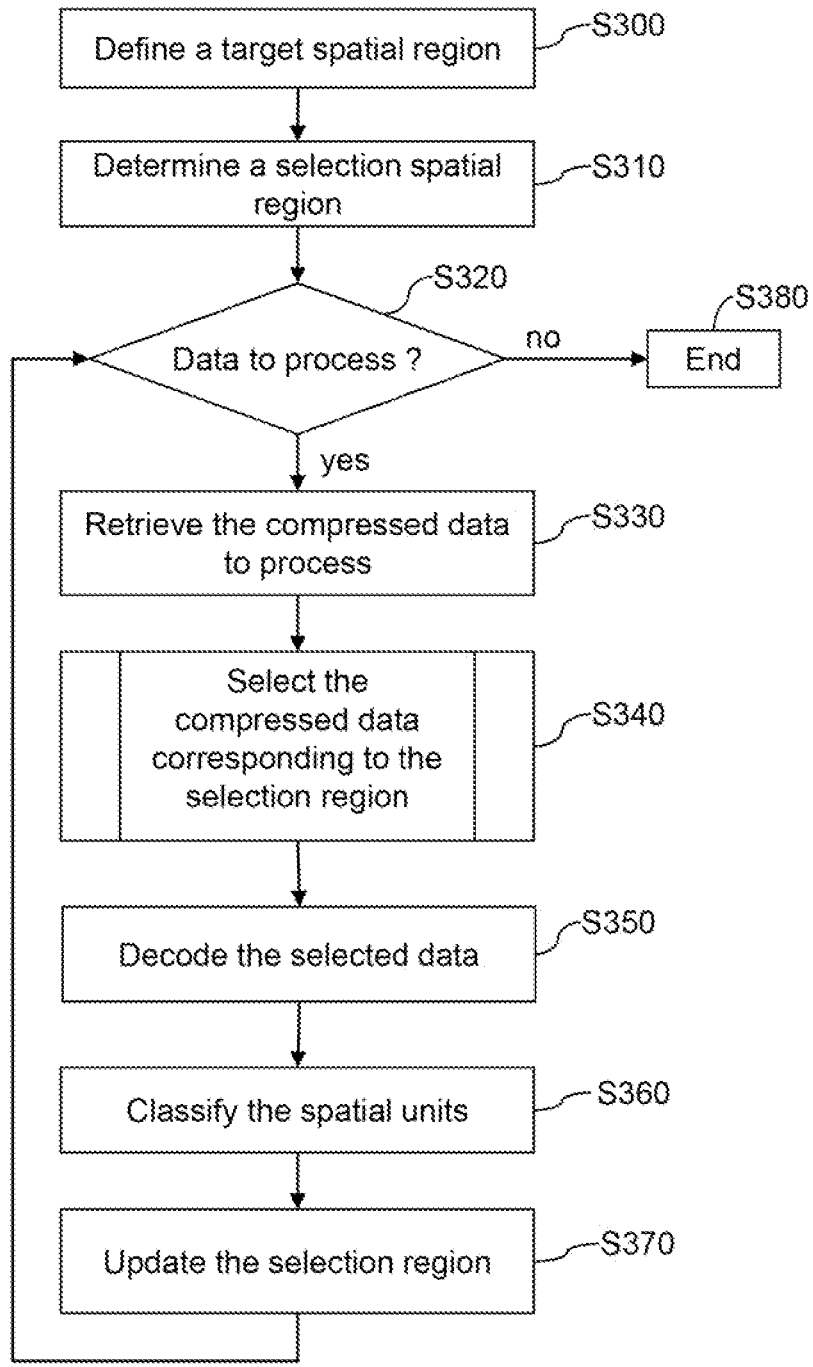
FIG. 3 illustrates, in flow diagram form, general steps of and embodiment of the present invention.

With reference to FIG. 3, the main steps of a method in accordance with an embodiment of the invention will now be described.

At step S300, a viewing window corresponding to a target spatial region 160 is defined, in particular by a user at the client terminal 12.

At step S310, a selection spatial region 170 is then determined.

This selection region may be initially computed on the basis of video encoding parameters of the video sequence 15 to access, by means of pre-established heuristics, using the knowledge of the encoding as a basis for example. For example, for the use of encoders of limited capability (which reduce the time devoted to the prediction by limiting consideration to a close neighborhood of the macroblock to predict), a selection spatial region 170 slightly wider than the target region 160 may be chosen.

As a variant, this computation may be carried out on the basis of past decoding operations on video contents, possibly on that same video sequence.

It will be noted moreover that the size of a group GOP 100 may also influence this computation, when the same selection spatial region 170 is used for the whole GOP. To be precise, in the presence of a lower number of predictions for a smaller GOP, the selection spatial region will be all the smaller if the group GOP is small.

Further to the determination S310 of the selection window, the compressed data of the video sequence may be processed, which here are the data relative to a group GOP 100. Of course, according to the case involved, those data may correspond to an image or even to an image portion only.

For each group GOP to process (test S320), the compressed data corresponding to that group 110 are retrieved from the database 14 (step S330).

The part of those data corresponding to the selection spatial region 170 determined at step S310 is selected (step S340), as for example described below with reference to FIG. 8.

When this selection is carried out at the server 11, the compressed data so obtained are generally transmitted to the requesting client terminal 12. As a variant, selection and decoding may be conducted within the same item of equipment.

At step S350, those obtained compressed data are decoded. Thus at this step decoding is carried out of the compressed data corresponding to the target spatial region 160 (that is to say that which the user wishes to view) and of the compressed data outside the target region (potentially the data constituting macroblocks or other spatial units of reference for a prediction). Conventional mechanisms of identification of the data obtained enable it to be known what parts of the image they correspond to.

The following step S360 then consists of obtaining at least one item of information on the basis of which will be decided the updating of the selection spatial region 170.

In the present example, step S360 consists of classifying spatial units of the group GOP 100, here macroblocks 150, according to their usefulness in the decoding of step S350. Usefulness encompasses at least two cases: the usefulness in terms of belonging to the target region 160 to view, and the usefulness in terms of the prediction (a macroblock is useful in this regard if it constitutes a reference macroblock for data of the target region to decode), whether spatial or temporal.

Classification mapping of spatial units is thus obtained.

By way of illustration, this classifying may create three groups:
- a group G1 of the "useful" macroblocks, comprising the macroblocks selected at step S340 and which are useful for the decoding of the compressed data corresponding to the target spatial region 160. These macroblocks group together the macroblocks of the region to view 160, but also selected macroblocks which serve as a reference for macroblocks of the target region 160 (generally by spatial prediction).
- a group G2 of the "non-useful" macroblocks, comprising the macroblocks selected (and possibly not selected) and which are not useful for the decoding of the compressed data corresponding to the target spatial region 160. In the main case, these are thus macroblocks belonging to the spatial portion situated between the target and selection regions 160 and 170, and which have not been used as reference blocks for the decoding of the data of the target region; and
- a group G3 of the "necessary" macroblocks, comprising the non-selected blocks which prove to be useful for the decoding of the compressed data corresponding to the target spatial region 160. In particular these are the macroblocks external to the selection spatial region 170 which however serve as a reference in the prediction of the macroblocks of the target region. They can be identified by virtue of the prediction information (motion vectors) stored in the compressed data.

Of course, in the presence of several images that are interdependent due to the temporal prediction, this classifying is carried out in common for all the images. This is the case in our example in which a group of images GOP is processed. In this case, by projection of the location of each of the classified macroblocks on the same image, bi-dimensional mapping is obtained. For example, if a macroblock of the target region 160 is temporally predicted by the first macroblock of a later image, it is considered that the first macroblock is "necessary".

Further to classifying step S360, the selection spatial region 170 is updated on the basis of that classifying obtained (step S370), such that the next content to process (in our example a new group GOP of images—return to step S320) is processed using that updated selection spatial region.

The processing continues until the compressed data of interest have run out, for example because the temporal section [t1, t2] specified in the request by the user has been entirely processed.

The steps of classifying S360 and updating S370 will be described in more detail below with reference to FIG. 6. These two steps are presented here in the form of separate steps for clarity of explanation. However, their processing may be carried out in a single step, without actually constructing the mapping referred to. For example, this mapping may be reduced to one or more parameters or criteria defining the selection spatial region 170, for example a parameter for modifying each side of such a rectangular region.

Figure 4:
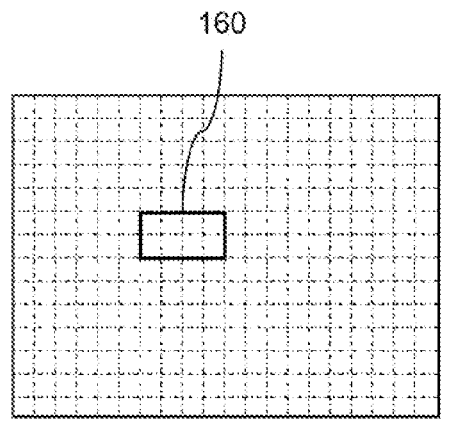
FIG. 4 illustrates a classification of macroblocks in the image on implementation of the invention for updating a selection spatial region.
Figure 4:
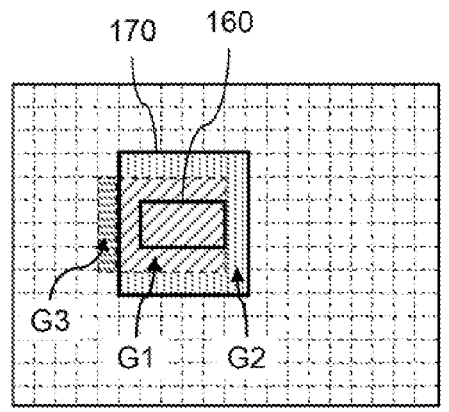
Figure 4:
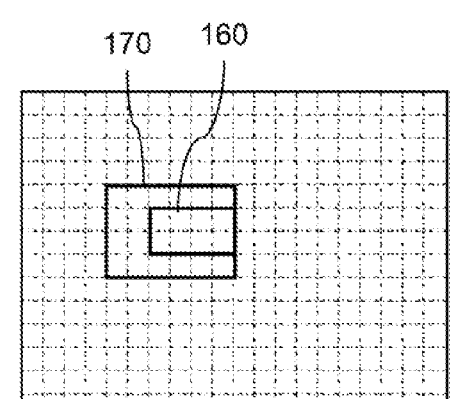

FIG. 4 illustrates this classifying and the resulting updating using an image in which a target spatial region 160 has been defined (FIG. 4a).

FIG. 4b shows this same image in which a selection spatial region 170 has been represented, as well as the various groups obtained after classifying: G1 with diagonal cross-hatching, G2 with vertical cross-hatching and G3 with horizontal cross-hatching. As mentioned previously, the macroblocks of group G3 may correspond to reference macroblocks coming from images other than the image in course of being processed. They are projected here onto the same image to obtain bi-dimensional mapping.

In this example, all the necessary data (that is to say which are useful but not selected) are on the left of the selection window 170, whereas the non-useful data are around the other three sides of that rectangular window. By way of illustration, such a situation may for example occur when the video sequence results from camera tracking, progressively offsetting the region of interest.

In this case, the updating of the selection spatial region 170 may simply consist of increasing this region on the left part to incorporate the necessary macroblocks, and of reducing that region on the other sides to extract a maximum of non-useful macroblocks without however extracting the useful ones. Thus, according to the dividing up of the image into slices carried out at the encoder, further to the updating of the selection spatial region 170, some slices may no longer need to be supplied to the decoder.

FIG. 4c shows the result obtained for processing the next group of images.

In this example, it can thus be seen that the decoding of the compressed data corresponding not only to the target spatial region 160 but also to the selection spatial region 170 influences the updating of this selection spatial region 170 on the basis of which the compressed data are retrieved for a following image or a following GOP. This influence arises from the fact that certain selected data are non-useful (group G2) and/or that certain non-selected data prove to be useful (group G3).

Embodiments of the present invention may apply to the local access to a part of a video sequence stored locally, for example in the case of a decoder equipped with a hard disk for storage.

Figure 5:
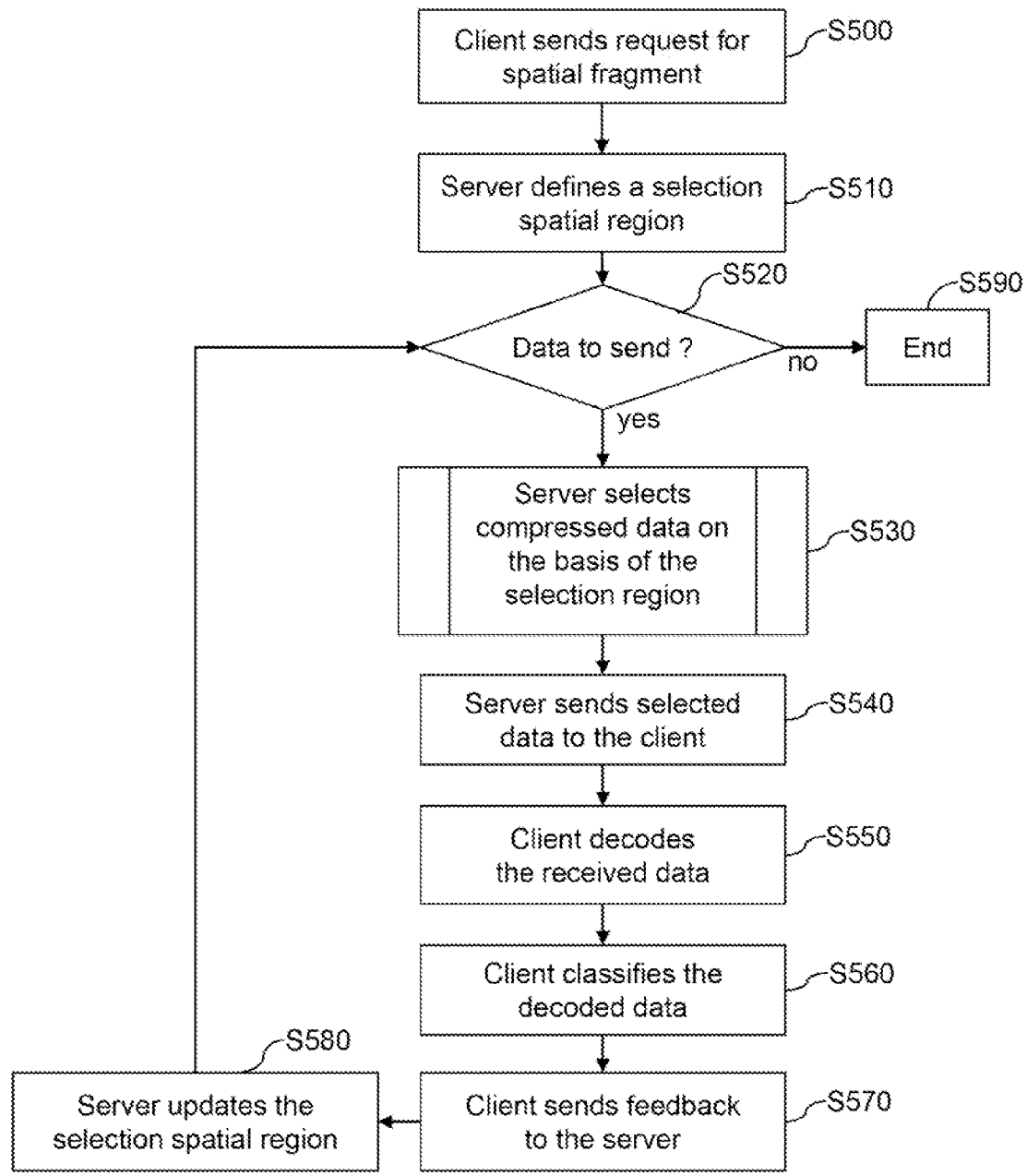
FIG. 5 illustrates, in flow diagram form, steps of an example of implementation of the invention in a client-server context.

It also applies in the context of client-server communication, as represented in FIG. 1, in which the server 11 may play the role of encoder of video sequences and the client terminal 12 that of the decoder. A description is now given of an example of implementation of an embodiment of the invention in such a context, with reference to FIG. 5.

At step S500, a user defines, at his client terminal 12, a spatio-temporal part of a video sequence 15 which he wishes to access. This spatio-temporal part defines among others a target spatial region 160. The client terminal 12 then sends the server 11 a request for access to the corresponding spatial fragment, for example by using the Media Fragments format.

At step S510, the server 11 receiving this request determines a selection spatial region 170 encompassing the target spatial region 160 defined in the request, in similar manner to step S310 described earlier.

For the server, test S520 consists in verifying whether there remain data to send (in this case data by group GOP). This test corresponds to verifying whether all the compressed data corresponding to the requested fragment have been transmitted to the client terminal. It may simply be a matter of verifying that the temporal section [t1, t2] possibly indicated in the request has not been entirely processed.

So long as data remain to transmit (output "yes" from test S520), steps S530 to S580 are executed for each set of data (here each successive group GOP).

At step S530, the server 11 selects, from the base 14, the compressed data corresponding to the selection spatial region 170, for example the slices containing at least one part of the data belonging to the selection region 170.

These selected compressed data are then transmitted to the client terminal 12, for example using the Media Fragments protocol (step S540).

The client terminal 12 then proceeds with the decoding (step S550) of the data so received to exploit them (display the target region 160 and/or store these data locally, etc.).

On the basis of these decoded data, it moreover determines (step S560) at least one item of updating information for the selection spatial region. This information may consist in a mapping that results from classifying spatial units, for example macroblocks, as mentioned supra for step S360.

The client terminal 12 then sends (step S570) a feedback message to the server 11 based on the updating information represented in particular by this classification. This message may be transmitted easily in a real time streaming communication channel of RTSP ("Real Time Streaming Protocol") type.

As a variant, steps S560 and S570 to produce the updating information may, for the client terminal 12, consist in:
  itself calculating the selection spatial region updated for example on the basis of said classifying, knowing the selection spatial region 170, and
  transmitting to the server, as updating information, the parameters defining that updated region.

In this case, the server merely has to apply the selection window directly.

In another variant, the client terminal 12 may only send to the server the identification (that is to say the location in the images) of the "necessary" spatial units (macroblocks) corresponding to those of the group G3 defined supra. The server 11 then merely increases the selection spatial region 170 on the basis of those necessary spatial units.

In a further variant, the client terminal 12 may just send to the server statistical information or parameters relative to the different sides delimiting the selection spatial region. This information may in particular indicate the number of "necessary" (useful non-selected) spatial units and the number of "non-useful" (selected but not useful) spatial units which affect each of the sides. In this case, the server will compute the position modification of each of these sides on the basis of these transmitted parameters.

On the basis of this updating information or this classification, the server 11 then proceeds with the updating (step S580) of the selection spatial region 170, by adjusting for example the sides of this region to encompass all the macroblocks of the groups G1 and G3 and exclude a maximum of non-useful macroblocks (that is to say of the group G2 or in each of said groups).

In a particular embodiment, the server takes into account uniquely the "necessary" macroblocks to enlarge the selection spatial region so as to integrate therein all these macroblocks, but also takes into account information on congestion of the network 13 to determine (by comparing for example values representing that congestion with threshold values), the case arising, if the selection spatial region must be reduced.

The selection spatial region updated at step S580 is thus the one which is used at the following iteration of step S540, that is to say in our example, for the processing of the compressed data relative to the next group GOP of images.

On account of the coherence between the successive images (and thus of the successive GOPs), the compressed data selected at the time of the processing of the following GOP will generally be sufficient (or at least with a reduced number of errors) to decode the target spatial region 160 for the images of the following GOP.

It can be seen here that the additional processing operations implemented by the server and the client terminal to obtain this result are of low complexity relative to a conventional client-server transmission (steps S530 and S580 for the server and steps S560 and S570 for the client terminal).

Figure 6:
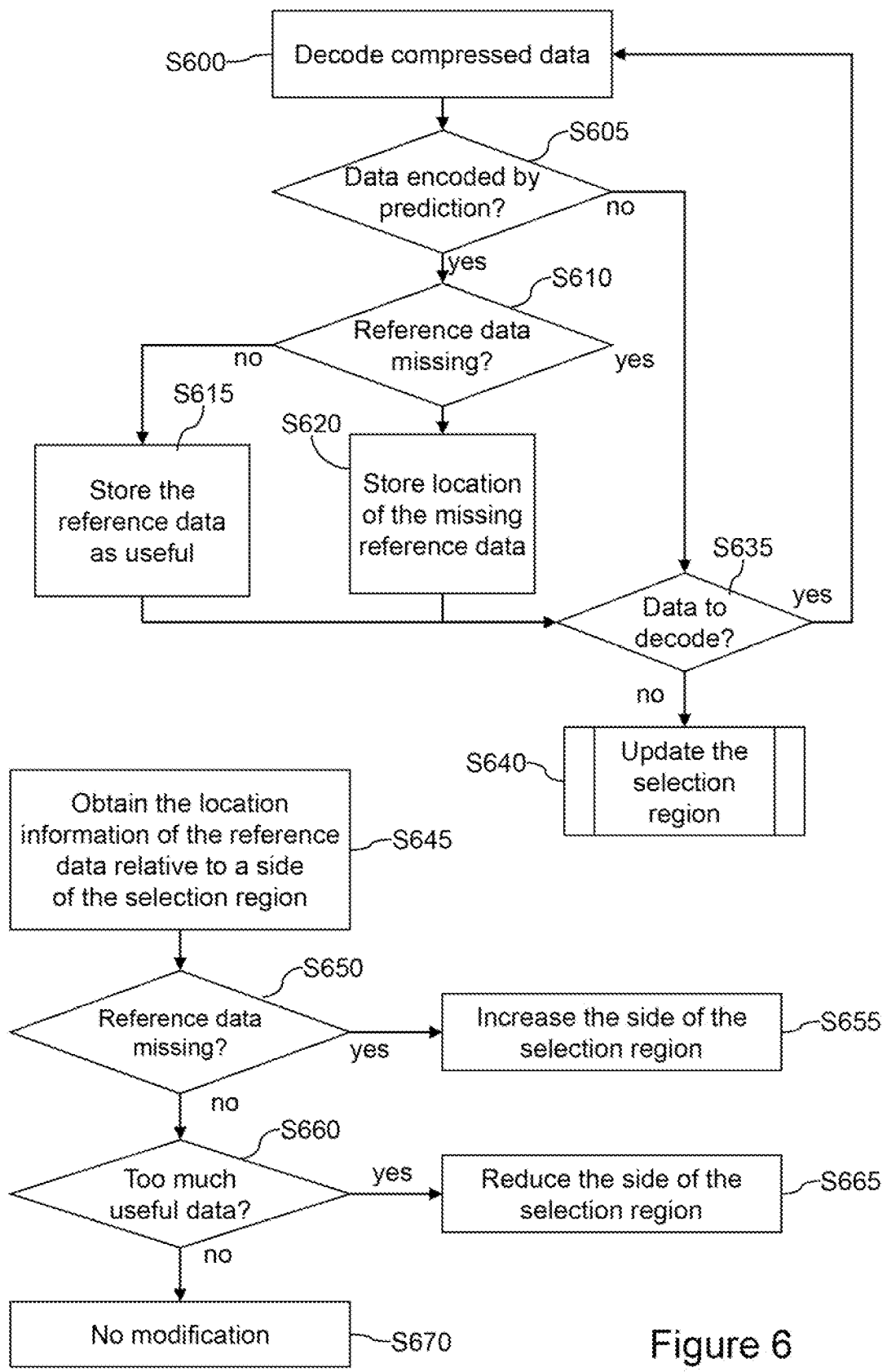
FIG. 6 illustrates, in flow diagram form, steps for the updating of the selection spatial region.

With reference to FIG. 6 a description is now given of an example of processing for updating the selection spatial region 170 on the basis of the decoding of the selected compressed data, as mentioned for example during steps S350 to S370.

The first step S600 consists in decoding compressed data (macroblock by macroblock).

This step makes it possible to determine whether these data were coded by temporal/spatial prediction (test S605), in which case a reference macroblock is identified.

If it is not the case, the next macroblock is proceeded to following the test S635.

If it is the case, it is verified at step S610 whether the decoded data of the identified reference macroblock are already possessed. Either this macroblock belongs to a preceding image already decoded, or it belongs to the same image but is supposed to have been decoded before.

If the reference macroblock is missing (output "yes" from test S610 in the drawing), the location of this macroblock is stored in a list G3 of the "necessary" macroblocks (step S620).

Otherwise, the location of this macroblock is stored (S615) in a list G1 of the "useful" macroblocks.

It is to be noted that these lists correspond to the groups referred to with reference to FIG. 4: the macroblocks within the target region 160 are initially marked as "useful", those outside as "non-useful". The steps S615 and S620 thus enable this classifying of the macroblocks to be updated, by changing a "non-useful" macroblock into a "useful" or "necessary" macroblock as appropriate.

Further to steps S615 and S620, the test S635 is carried out to iterate this processing on all the macroblocks.

When all the compressed data have been processed (output "no" from test S635), the updating of the selection spatial region 170 is proceeded with at the step S640.

Thus updating may consist in applying the steps S645 to S665 for each of the sides defining the selection spatial region 170, in particular for the four sides in the case of a rectangular selection region.

Given a chosen side of this region 170, there are obtained at step S645 the location information of the reference macroblocks concerned by that side (that is to say in particular of the necessary macroblocks situated outside the region 170 relative to said side and of the non-useful macroblocks situated on the other side).

By analysis of the quantity of "necessary" macroblocks (test S650 comparing for example an absolute quantity or a ratio relative to the "non-useful" macroblocks with a threshold value), the side considered of the selection region 170 is enlarged if that quantity is high (step S655). In particular, it is possible to ensure that all the "necessary" macroblocks are encompassed.

In the opposite case, if in particular a high number of macroblocks are "non-useful" (test S660 comparing for example an absolute quantity or a ratio relative to the number of macroblocks in the region 170 with a threshold value), the side considered of the selection region 170 is reduced in size (step S665).

Otherwise no modification of the selection region 170 is carried out (step S670).

As a variant of the analyses provided above, it is possible to determine the position of the side of the region 170 by minimizing a function comparing the number of "necessary" macroblocks with the number of "non-useful" macroblocks (which both vary according to that position of the side). Here it is attempted to obtain the best ratio between the number of "necessary" macroblocks added to the selection region and the cost increase of transmission of the data selected by that modified region.

In a variant of the analysis by mapping described above with reference to FIG. 4, the updating may implement the use of statistical information resulting from the decoding, such as the average movement of the target spatial region between several successive groups GOP, to deduce therefrom an adjustment of the sides of the selection spatial region. This approach may be applied for example in the case of a video sequence reproducing camera tracking with a fixed scene.

In another variant, the motion vectors 140 of the macroblocks 150 of the target spatial regions 160 on the current group GOP 100 may be stored in memory and used to obtain more precise statistical information, for example the regions of the image towards which the motion vectors point the most or else a direction favored by those motion vectors (resulting for example from the average of all those vectors).

This information resulting from an analysis of the motion vectors will then be used to determine the updated selection spatial region more precisely.

In the case of the use of statistical information, this information may be limited to regions that are close to the selection region 170 before updating to reduce the statistical analysis required.

Of course, these various approaches enabling the updating of the selection region may be placed continuously in competition, for example at each new access to a video sequence 15 or for each new group GOP 100 processed. Parameters such as the type of video content (scene taken from far away with slow tracking or a scene taking from very close up with fast movements of the camera and in the scene filmed), the encoding options and/or else the needs of the user are relevant to the choice of the approach to apply. The encoding options reflect for example encoding of low complexity (fairly simple computation of motion vectors that is limited spatially and temporally) which is typical of encoding on a video camera, or on the contrary very complex encoding (exhaustive search for spatial and temporal references) which is typical of encoding carried out on machines having high processing capacities.

This choice may in particular be made before the transmission by streaming of the (spatially) filtered video content in the client-server context. Two principle criteria may be used:
   the complexity of the references: the more complex the references, the less the invention is used and the transcoding or the sending of all the data is switched over to;
   the capacity of the decoder to compute additional statistical information: the more the decoder has capacities for performing such computations, the more that computing is performed of the statistical information enabling the position of the selection window to be improved.

Figure 7:
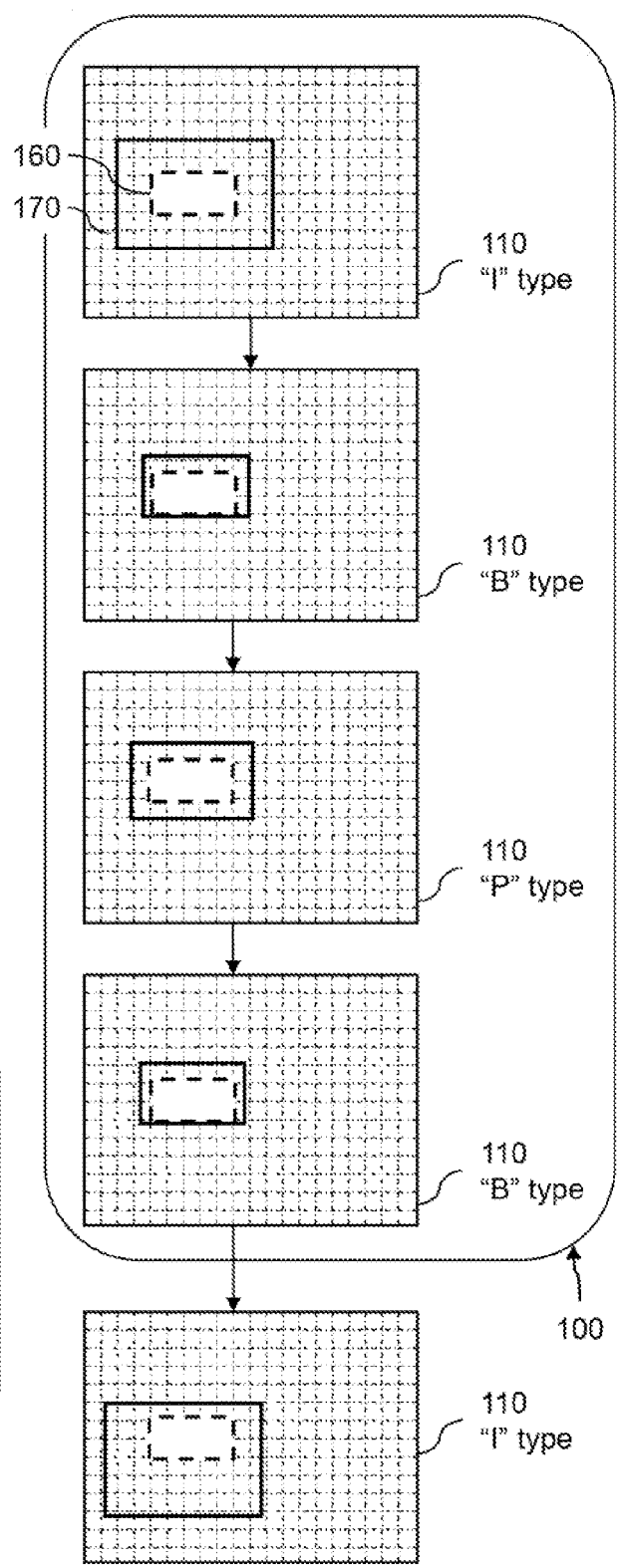
FIG. 7 illustrates the setting up of the adaptation of the selection spatial region within a group of images to process conjointly.
Figure 8:
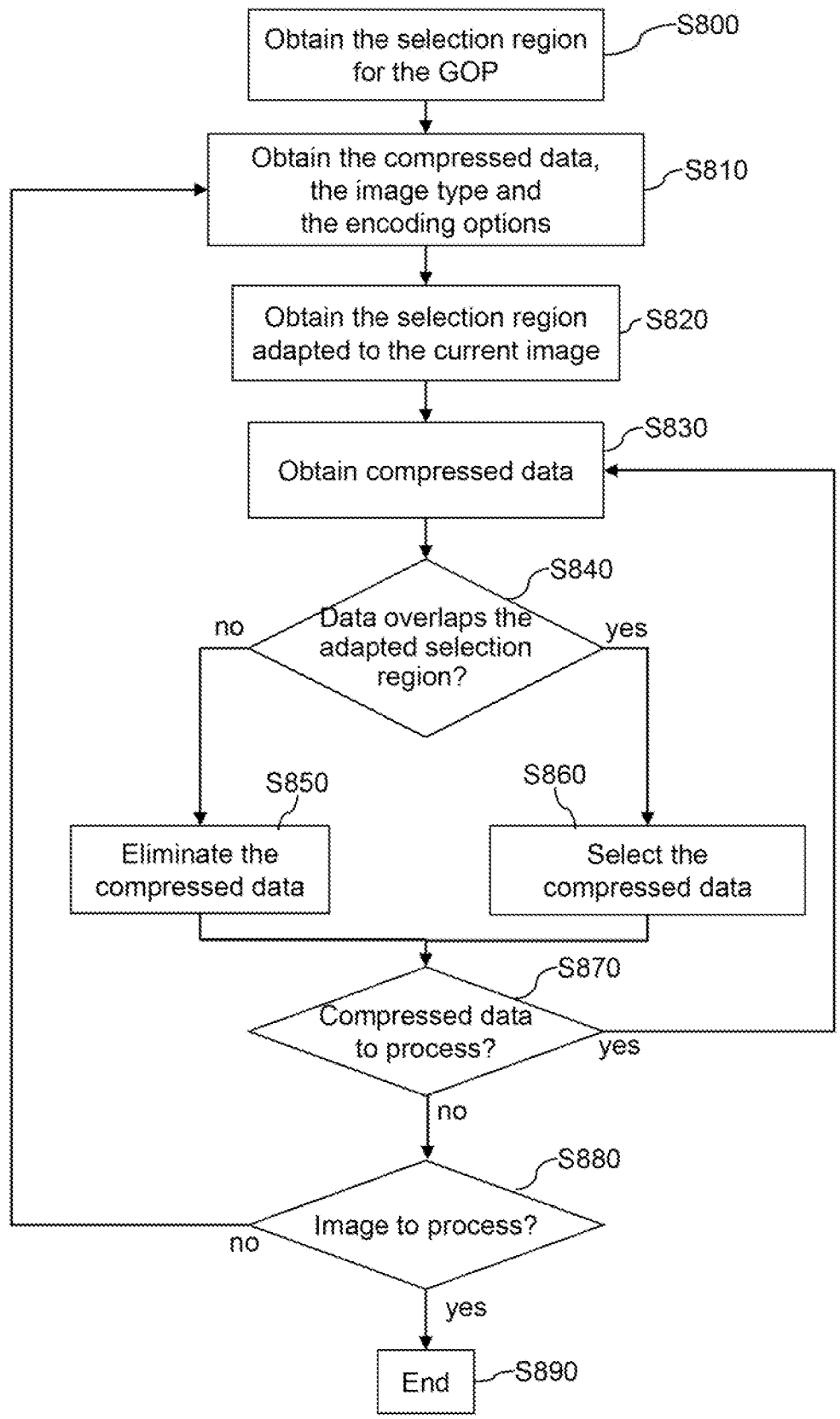
FIG. 8 illustrates, in flow diagram form, steps for selecting compressed data on the basis of the selection spatial region.

A description is now given, with reference to FIGS. 7 and 8, of the operations of selecting compressed data 15 using the selection spatial region 170, as mentioned in particular above with reference to step S340. This selection takes place between two instances of feedback from the client terminal 12: one instance of feedback on processing the preceding group GOP, and the next instance of feedback on processing the current group GOP.

This selection spatial region 170 is fixed for a current group GOP 100 of images. However, within the group, for selecting the compressed data, this spatial region may be adapted according to the type of image concerned, in particular the types "I", "P" and "B" for MPEG-2 coding. Below, reference will therefore be made to selection spatial region associated with the group GOP to define the most general region, and selection spatial region adapted to an image to define each region more specific to an image type (or any other type of parameter that may be taken into account).

Naturally, as a variant, the selection spatial region associated with the GOP may be used, as it is, for each of the images of the GOP.

FIG. 7 illustrates the adaptation of the selection spatial region 170 when solely the criterion of image type is considered. The target spatial region 160 (rectangle in broken line) defined by the user in his request is similar for all the images 110 of the GOP 100 to process. The selection spatial region 170 for each image is represented in unbroken line.

For the first I image, this selection region 170 is substantially wider than the target region 160. This is explained by the fact that this I image serves as a reference image for a high number of other images P and B. Thus, a high number of reference macroblocks is present in this I image, and the selection region 170 is provided to encompass all these macroblocks (or a large majority).

For the second image, here of B type, which by definition never serves as reference image for the coding of other images, the selection spatial region 170 is substantially smaller, of the same size or hardly wider than the target spatial region 160.

The following image is of P type and may thus serve as reference image for a few other later images. As this image is in competition with the preceding I image as regards predicting later image data, it is generally assumed that the motion vectors will be smaller when reference is made to that P image than to the I image. The selection region 170 is thus of size intermediate between that adopted for the image of I type and that adopted for the image of B type.

As the following image is of B type, the same spatial region 170 is applied as for the second image, and so forth.

A convention may be set up to determine the rate of reduction applied to the selection region for each type of image: for I images, the selection spatial region 170 is applied as defined for the GOP; for the B images, the selection region applied is for example identical to the target region or else larger by a certain percentage; for the P images, a selection region is applied of size intermediate between those for the I and B images, for example of median size.

At the end of the group GOP, the selection spatial region 170 is updated according to the teachings of the invention to be applied to the following images.

As illustrated by FIG. 8, the selection of the compressed data comprises a first step S800 during which is retrieved the selection spatial region 170 defined for the image or images to process, typically for the current group GOP 100.

At step S810, the compressed data of the current image (stored in the database 14), the current image type and the coding options are retrieved. These parameters enable more precise definition of the selection spatial region adapted to the image to process.

For example, these parameters enable an upper bound to be defined for the lengths of the motion vectors used. In this case, this upper bound is used to adjust the selection spatial region adapted to the current image (step S820), to a region encompassing that upper bound in all directions.

At the following step S830, a first set of current compressed data is obtained from among the compressed data retrieved at step S810. This is for example a macroblock or a slice easily identifiable by virtue of the markers present in the video stream of the compressed sequence 15.

It is then determined (step S840) whether these obtained data at least partially overlap the selection spatial region adapted to the image at step S820. Generally, the header of the current compressed data contains information making it possible to know or compute the position of these data in the image. Thus, by mere comparison of this position with that of the adapted selection spatial region, it is easy to determine whether the current compressed data are within, overlap or are outside this adapted selection spatial region.

If the set of the current compressed data is entirely outside this adapted selection spatial region, this set is excluded at step S850 before proceeding to the following compressed data (test S870).

In the opposite case, two cases are considered (step S860):
if all the current compressed data are within the adapted selection region, the set of these data is selected;
if these current compressed data are partially within this region (situation in which the set of data overlaps the region), a choice is then made according to one or more specific criteria to determine whether that set of data is selected or not.

By way of example, a slice of compressed data may be selected if at least one predefined quantity of macroblocks of that slice is within the selection region considered. As a variant, a ratio between the number of macroblocks within and the number of macroblocks outside may be taken into account and compared with a threshold ratio.

Optionally, weighting of the macroblocks may be performed to give more weight to those at the center of the selection region considered (since more likely to be used) and less weight to those close to the edges of that region. Of course, certain protocols implemented in a client-server context enable a part of a considered set of data to be transmitted. In this case, only the relevant macroblocks (within the selection region) of the current slice are selected to be transmitted to the client terminal 12.

Next the following compressed data are dealt with (test S870).

Once all the compressed data have been processed (output "no" from test S870), it is verified whether additional images to process remain (test S880) in which case step S810 is returned to. Otherwise, the processing terminates (step S890).

Figure 9:
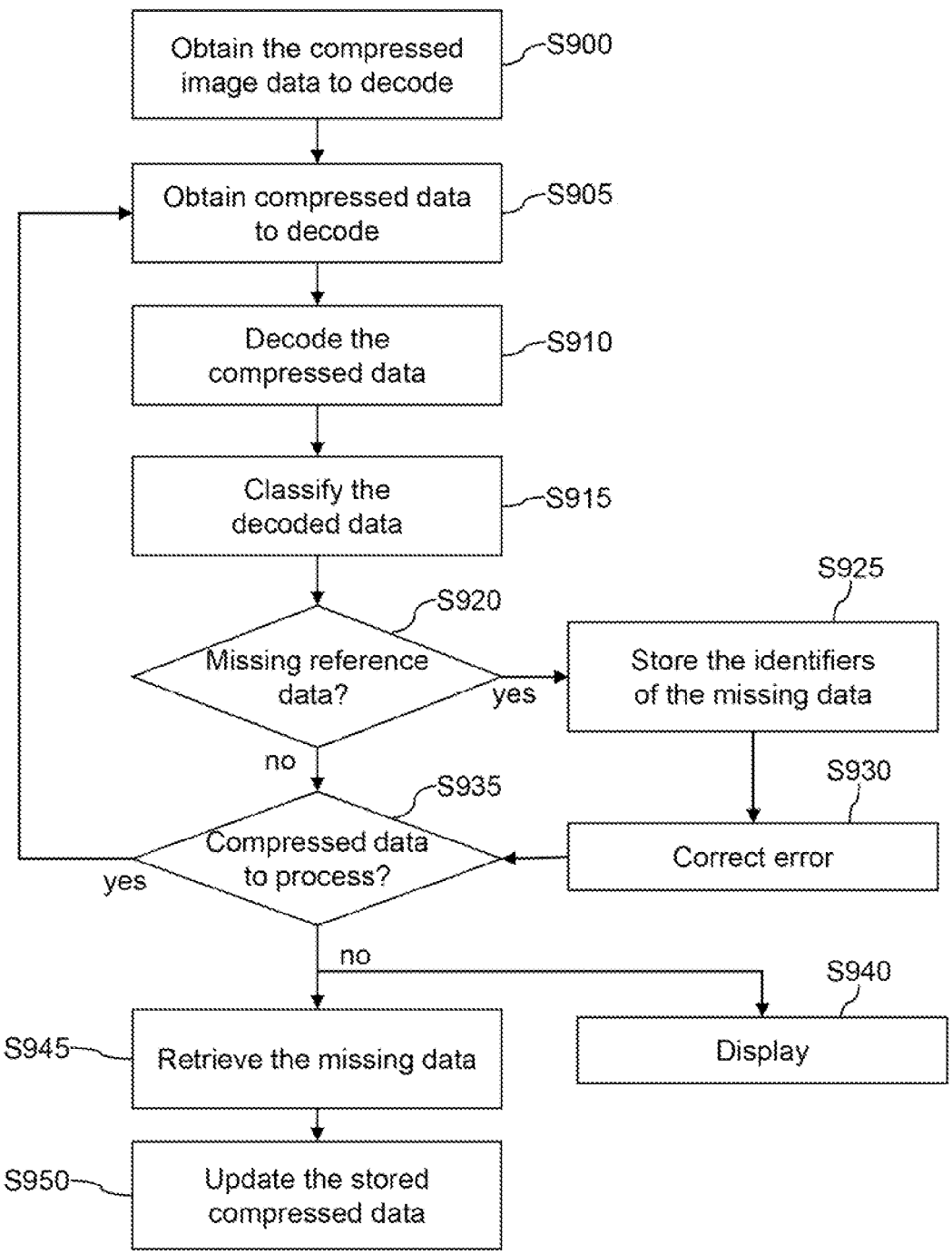
FIG. 9 illustrates, in flow diagram form, an example of application of the invention in a client-server context.

With reference to FIG. 9, a description is now given of an application of embodiments of the invention in a client-server context, in which the client terminal 12 wishes both to proceed with the display of the requested video (spatio-temporal part identified in the user request) and with the storage thereof after downloading for later re-use.

In this application, the client terminal 12 will wish to immediately correct the missing data (the "necessary" data as defined earlier: the non-selected macroblocks serving as reference for the coding of other data of the target spatial region 160) not only to proceed with the display, but also to retrieve those missing data to locally possess a complete version of the requested video.

As mentioned below, in this case, the client terminal 12 will first of all proceed with the identification of the missing macroblocks, then with their immediate correction using error concealment mechanisms to obtain an acceptable display and lastly with the request, from the server 11, for those missing macroblocks in order to improve the quality of the stored video.

Initially, the client terminal 12 sent a first request to the server 11 to obtain a spatial fragment. The server thus sent back the selected compressed data as described earlier. The client terminal thus has these compressed data in memory.

At step S900, the client terminal 12 obtains compressed image data to decode, by retrieving them from its memory for example.

A first set, for example a slice or a macroblock, of compressed data to decode is then obtained at step S905.

These compressed data are then decoded conventionally (step S910) which leads to classifying of the various spatial units involved in that decoding (step S915, similar to S360).

Where a spatial unit (for example a macroblock 150) is missing (test S920), an identifier of that spatial unit is stored in a list G3 of necessary blocks (step S925). By way of example, the number of the slice or NAL ("Network Abstract Layer") unit to which the missing macroblock belongs may be stored or else the indices of that macroblock and of the reference image to which it belongs may be stored directly.

Next, the absence of that spatial unit is corrected (step S930) using conventional mechanisms for constructing the image to display: for example by re-using spatially or temporally neighboring information.

Further to step S930 or if no spatial unit is missing, it is verified whether compressed data remain to be processed (test S935), in which case step S905 is returned to in order to successively process those compressed data until they have run out.

When all those compressed data have been processed, the image or the group GOP of images, incorporating any corrections S930, is displayed at step S940.

In parallel, the client terminal 12 informs the server 11 of the "necessary" macroblocks which are missing, for example by giving their identifiers. This information may take the form in particular of a request to obtain content. Of course, in accordance with the teachings of the present invention, this information may be used at the server 11 to update the selection spatial region to process the following group GOP of images.

Thus, at step S945, the server 11 retrieves the missing macroblocks, then sends them to the requesting client terminal 12 in order for the latter to be able to update (step S950) the compressed data which it stores by putting the retrieved macroblocks at the appropriate places. The compressed data thus stored therefore prima facie constitute an error free video.

It is to be noted that since these missing macroblocks are useful solely for a future use of the stored compressed data, their retrieval is not a priority and may therefore be processed in a non-priority channel by the server 11. In particular, this retrieval may be carried out once the entirety of the video has been displayed or at the time of a later request for display of that stored video by a user.

Figure 10:
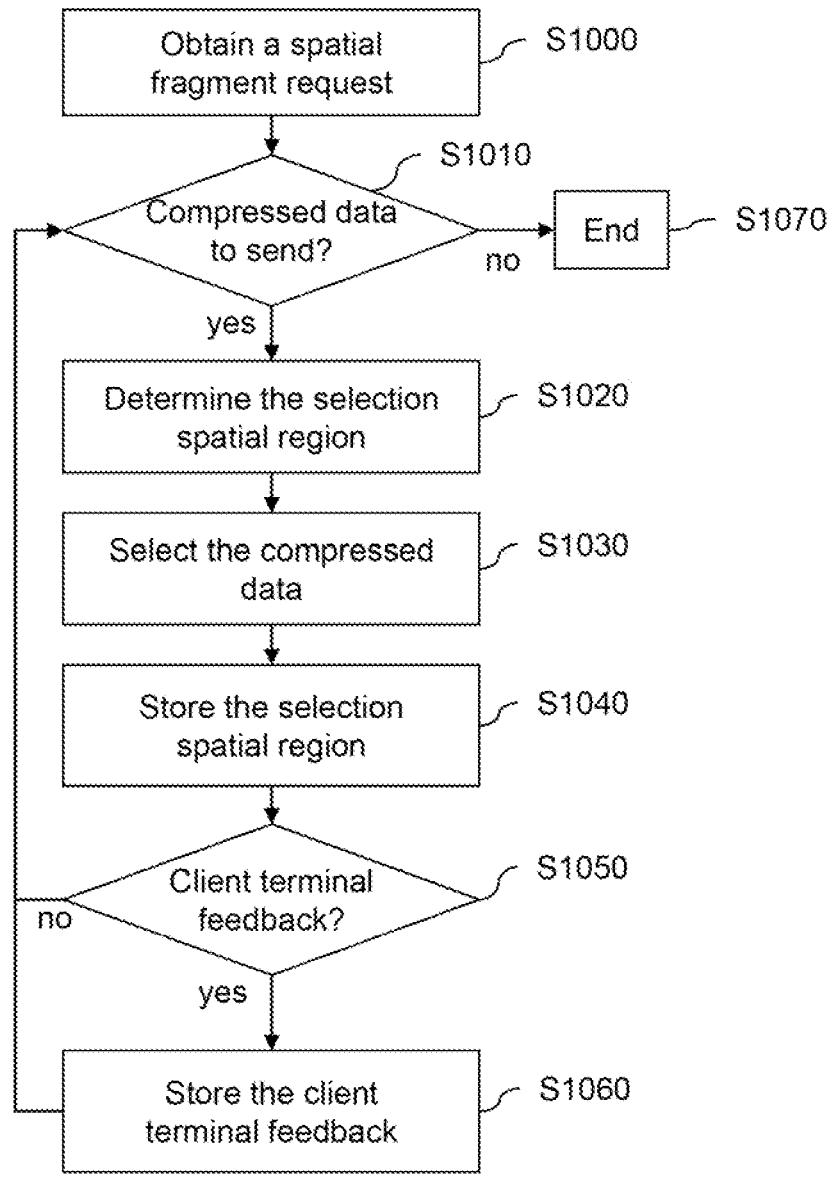
FIG. 10 illustrates, in flow diagram form, steps for the storage of history information relative to the processing of requests for spatial access to a video sequence.
Figure 11:
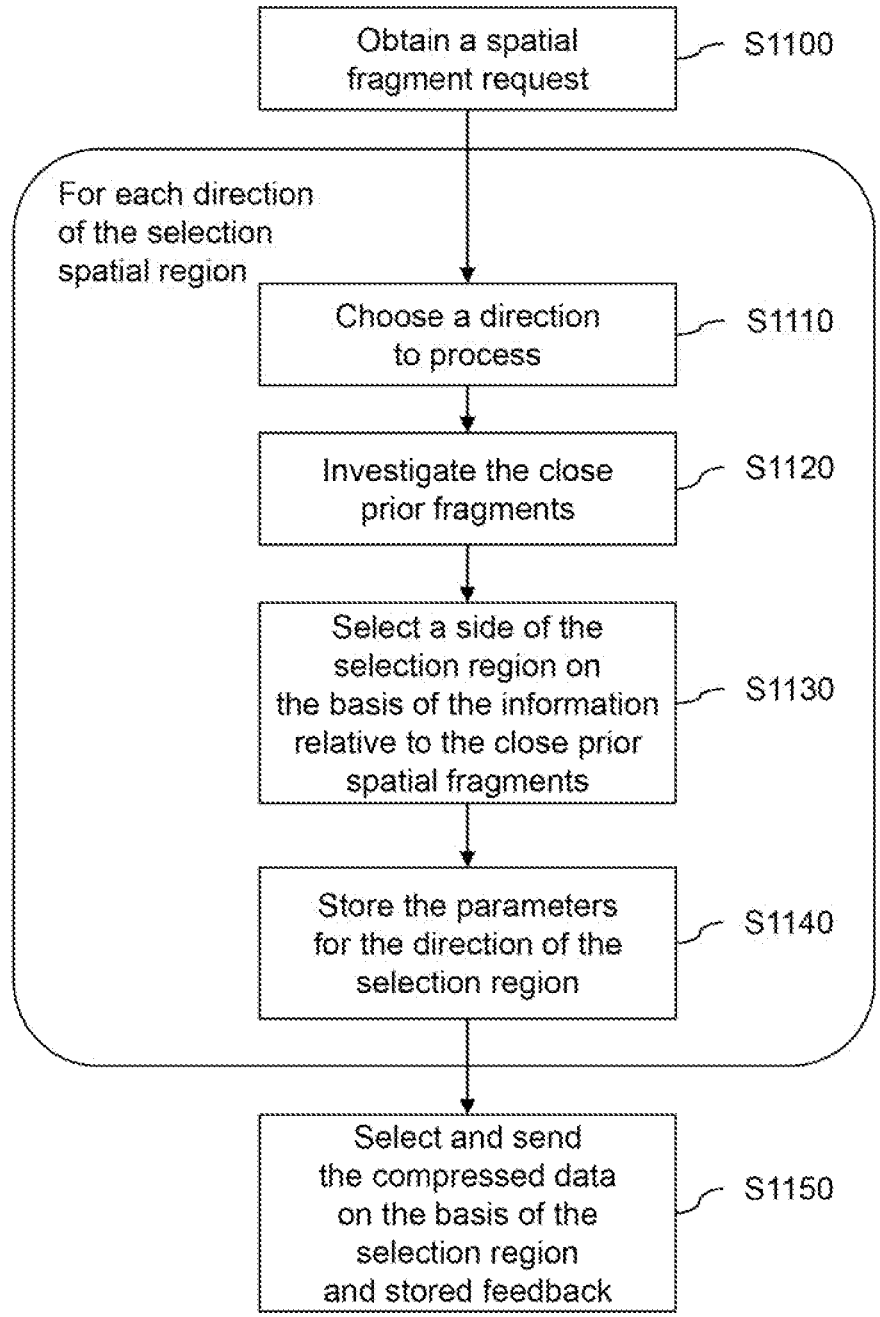
FIG. 11 illustrates, in flow diagram form, steps for the use of that history information on computing or updating the selection spatial region.

Referring to FIGS. 10 and 11, a description is now given of an embodiment of the invention, still in a client-server context, which is particularly well-adapted to the case of a video having abrupt changes in scene, for example when the shooting angle has changed.

In this case, feedback from the client terminal 12 generally proves to be of low effectiveness when it is a matter of predicting, for example, the movement of the next group GOP starting from the current group GOP. This is because, after such an abrupt change in the video, a peak in missing macroblocks may occur.

According to this embodiment, the server 11 obtains several successive requests for spatial fragments for the same video sequence 15 and stores information obtained on processing of each of those requests. This information may advantageously be of small volume and will in particular be used to improve the result of the following requests.

By way of example, such information may simply be the location of the selection spatial region 170 used. Furthermore, if its resources so allow, the server 11 may also store the macroblock identifiers of missing data.

FIG. 10 describes the storage of such information and FIG. 11 describes its use to provide the compressed data corresponding to the requested spatial fragments.

With reference to FIG. 10, a first step S1000 consists of obtaining a spatial fragment request, this request, including the target region 160 that it indicates, being stored by the server 11.

So long as compressed data remain to be sent (test S1010), the steps S1020 to S1060 are iterated.

In particular, determination is made of the selection spatial region 170 used for that request (step S1020). The compressed data corresponding to that selection region are then selected and then transmitted to the requesting client terminal 12 (step S1030). These steps may in particular implement the mechanisms described previously.

At the following step S1040, the location of the selection region used is then stored.

In particular, this location may be expressed relatively with respect to the target spatial region 160 and to the selection spatial region used at the previous iteration of steps S1020-S1060. The storage of this information is thereby limited to a few bits.

If feedback from the client terminal 12 is detected (step S050), that feedback is also stored by the server 11. It may in particular be information of missing macroblock identifier type, a macroblock classifying map, and/or an increase/reduction parameter or statistics relative to each edge of the selection region.

In the absence of feedback from the client terminal or further to step S1060, the processing of the following data to send (test S1010) is carried out.

In addition, the byte ranges corresponding to the compressed data transmitted to the client terminal 12 may be stored.

Thus, by keeping this byte range information, if a new request arrives which is very close to a request that has already been processed, it is possible to rapidly send a result in byte range terms.

It is to be noted that, in the case of a real time encoder (at the server 11), exhaustive searches for the reference macroblocks are avoided since they require considerable processing. The reference macroblocks used are thus generally macroblocks in the neighborhood of the target spatial region 160. Thus few macroblocks should be missing whatever the chosen selection region. In this case, it is possible to merely store the location of the selection spatial region used.

On the contrary, for highly compressed videos for which the search for reference macroblocks is more extensive, or even exhaustive, these reference macroblocks may vary over the entirety of the image. In this case, the information on the missing macroblocks may be stored to obtain adequate selection regions for the following requests.

The processing of FIG. 10 is conducted for each of the requests processed. Once all the past requests have been processed, the operations of FIG. 11 may be conducted, in order to compute the selection spatial region 170 on the basis of the requested spatial fragment (that is to say on the basis of a target spatial region 160) and information stored on the basis of the processed requests.

These operations may in particular be implemented at steps S310 and S370.

Commencement is made at step S1100 by obtaining a current spatial fragment request. This request identifies a target spatial region 160 in the video sequence 15.

For each edge of the selection region (in particular the four directions up-down-left-right for a rectangular region), the steps S1110 to S1140 are carried out.

A first direction is chosen at step S1110. Next, at step S1120, the information stored (in accordance with FIG. 10) is investigated to obtain previously processed requests that are "spatially close" to the current request, for the current direction.

However, beforehand, pre-filtering of the requests already processed may be carried out: temporal filtering (requests that are not very old compared with a threshold value for example) and/or spatial filtering (requests concerning the same region of the image, for example by considering four regions dividing up the image). The parameters for these filtering operations may be enlarged if necessary to ensure that a certain number of already processed requests is taken into account for the investigation.

In particular, only the same side (top-bottom-left-right) of the already processed selection spatial regions may be chosen for that investigation. The latter then consists for example in computing the distances between the side of the target spatial region of the current request and the side of the selection spatial regions used for the already processed requests, then in comparing those distances with a threshold value.

To simplify this search, those regions may in particular be rounded to the boundaries of the macroblocks.

Further to this search, several "spatially close" prior requests have thus been identified. The information stored relative to these identified prior requests is then retrieved.

Next, at step S1130, the corresponding side of the selection spatial region for the current request is determined.

In particular, if the side for the current request, taken to the nearest macroblock, is the same as or is a sub-part of the corresponding side (according to the case, the top-bottom-left-right side) of an identified prior request, that side may define the corresponding side of the selection spatial region 170 being constructed for the current request.

Otherwise, the most conservative side (that among the identified prior requests which most enlarges the selection region) is kept.

Rather than adopting an approach by macroblock edge, it is possible to evaluate the proximity of the requests by adopting a slice-based strategy.

The information defining the side as chosen is then stored at step S1140 for the current direction.

After processing all the directions, the selection spatial region 170 has been entirely constructed, as defined by the information stored at step S1140 for each of the directions considered.

Next, the server 11 may thus select the compressed data corresponding to the selection spatial region 170 so defined and send them to the client terminal 12, at step S1150.

Furthermore, if information on macroblocks missing at the time of the prior requests is available, it may also be retrieved and transmitted by the server to the client terminal, even if it is not included in the selection spatial region. This makes it possible, in particular if the client terminal stores the transmitted video, to supplement it to have a version that is fully decodable without error (thus corresponding to step S945 of FIG. 9).

Furthermore, the server 11 may also attempt to adjust the selection spatial region using the history it has stored of the byte ranges already sent. In this case, the server possesses a link between the slices composing the image and the byte ranges, and may perform the analysis on the basis of the history of the slices to identify a prior request capable of approximating the current request. Thus the same data are sent back without again selecting blocks on the basis of the selection window.

In another embodiment, it is possible to use the history information stored at the time of the access to a temporal section of a video sequence for the processing of the access to another temporal section of that video sequence. To be precise, if those two temporal sections are not too far apart, the corresponding video fragments are generally coherent and the history information may thus be applied.

In similar manner, the history information stored on accessing a video sequence may be used for the processing of the access to another video sequence, provided for example that those two video sequences have identical or strongly similar encoding parameters. For example, in the case of video sequences encoded by the same encoder, the motion vectors may have a maximum amplitude. That information may then be used to initialize the selection window on the basis of that maximum amplitude.

Figure 12:
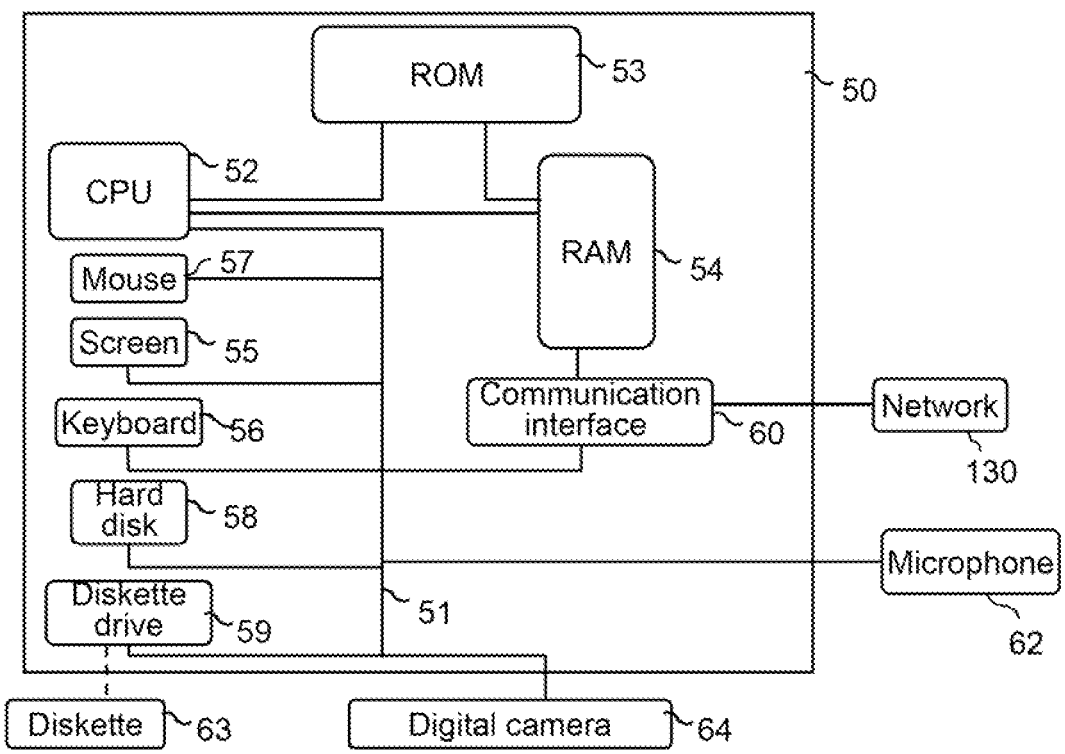
FIG. 12 shows a particular hardware configuration of a device adapted for an implementation of the method or methods according to the invention.

With reference now to FIG. 12, a description is given by way of example of a particular hardware configuration of a device for video sequence access adapted for an implementation of the methods according to embodiments of the invention.

A device implementing an embodiment of the present invention is for example a micro-computer 50, a workstation, a personal assistant, or a mobile telephone connected to different peripherals. According to still another embodiment of the invention, the device takes the form of a camera provided with a communication interface to enable connection to a network.

The peripherals connected to the device comprise for example a digital camera 64, or a scanner or any other means of image acquisition or storage, connected to an input/output card (not shown) and supplying multimedia data, for example of video sequence type, to the device according to an embodiment of the invention.

The device 50 comprises a communication bus 51 to which there are connected:

- a central processing unit CPU 52 taking for example the form of a microprocessor;
- a read only memory 53 in which may be contained the programs whose execution enables the implementation of the methods according to embodiments of the invention. It may be a flash memory or EEPROM;
- A random access memory 54, which, after powering up of the device 50, contains the executable code of the programs of the invention necessary for the implementation of embodiments of the invention. As this memory 54 is of random access type (RAM), it provides fast accesses compared to the read only memory 53. This RAM memory 54 stores in particular the various images and the various macroblocks as the processing is carried out on the video sequences;
- a screen 55 for displaying data, in particular video and/or serving as a graphical interface with the user, who may thus interact with the programs according to the invention, using a keyboard 56 or any other means such as a pointing device, for example a mouse 57 or an optical stylus;

a hard disk 58 or a storage memory, such as a memory of compact flash type, able to contain the programs of the invention as well as data used or produced on implementation of embodiments of the invention;

an optional diskette drive 59, or another reader for a removable data carrier, adapted to receive a diskette 63 and to read/write thereon data processed or to process in accordance with embodiments of the invention; and a communication interface 60 connected to the telecommunications network 130, the interface 60 being adapted to transmit and receive data.

In the case of audio data, the device 50 is preferably equipped with an input/output card (not shown) which is connected to a microphone 62.

The communication bus 51 permits communication and interoperability between the different elements included in the device 50 or connected to it. The representation of the bus 51 is non-limiting and, in particular, the central processing unit 52 unit may communicate instructions to any element of the device 50 directly or by means of another element of the device 50.

The diskettes 63 can be replaced by any information carrier such as a compact disc (CD-ROM) rewritable or not, a ZIP disk or a memory card. Generally, an information storage means, which can be read by a micro-computer or microprocessor, integrated or not into the device for accessing a spatio-temporal part of a video sequence, and which may possibly be removable, is adapted to store one or more programs whose execution permits the implementation of the methods according to embodiments of the invention.

The executable code enabling the device for accessing a spatio-temporal part of a video sequence to implement an embodiment of the invention may equally well be stored in read only memory 53, on the hard disk 58 or on a removable digital medium such as a diskette 63 as described earlier. According to a variant, the executable code of the programs is received by the intermediary of the telecommunications network 130, via the interface 60, to be stored in one of the storage means of the device 50 (such as the hard disk 58) before being executed.

The central processing unit 52 controls and directs the execution of the instructions or portions of software code of the program or programs of the invention, the instructions or portions of software code being stored in one of the aforementioned storage means. On powering up of the device 50, the program or programs which are stored in a non-volatile memory, for example the hard disk 58 or the read only memory 53, are transferred into the random-access memory 54, which then contains the executable code of the program or programs of the invention, as well as registers for storing the variables and parameters necessary for implementation of embodiments of the invention.

It will also be noted that the device implementing an embodiment of the invention or incorporating it may be implemented in the form of a programmed apparatus. For example, such a device may then contain the code of the computer program(s) in a fixed form in an application specific integrated circuit (ASIC).

The device described here and, particularly, the central processing unit 52, may implement all or part of the processing operations described in relation with FIGS. 1 to 11, to implement the methods of embodiments of the present invention and constitute the devices of embodiments of the present invention.

The preceding examples are only embodiments of the invention which is not limited thereto.

The invention claimed is:

1. A method of accessing a spatio-temporal part of a video sequence of images compressed using a coding format implementing a spatial-unit-based prediction, the method comprising, at a client terminal of a communication network, the steps of:

defining a target spatial region corresponding to said spatio-temporal part to access;

obtaining compressed data corresponding to a selection spatial region in at least one first image of the video sequence, said selection spatial region including said target spatial region;

decoding the compressed data corresponding to the selection spatial region in the first image to obtain a decoded part of the first image corresponding to the target spatial region in the first image;

identifying, based on said decoding step, spatial unit or units missing in the compressed data to decode the whole target spatial region in the first image, and projecting the location of the missing spatial unit or units on the same image;

identifying, based on said decoding step, non-useful spatial unit or units of the decompressed data that are not used to obtain the decoded part corresponding to the target spatial region in the first image;

generating, based on the identified missing and non-useful spatial unit or units, at least one item of updating information for updating the selection spatial region before it is used for at least one next image of the video sequence, the item of updating information being configured to add the projected missing spatial unit or units to the selection spatial region and to delete the identified non-useful spatial unit or units from the selection spatial region;

transmitting the item of updating information to a remote server storing the compressed video sequence, for the client terminal to obtain next compressed data corresponding to the updated selection spatial region in the next image of the video sequence.

2. A method according to claim 1, comprising the steps of:

decoding said obtained compressed data which correspond to the target spatial region; and classifying spatial units of images of the video sequence, according their utility on said decoding, so as to obtain an item of updating information on the basis of said classifying.

3. A method according to claim 2, wherein a spatial unit is useful on decoding compressed data corresponding to the target spatial region, when said spatial unit is included in the target spatial region or when said spatial unit comprises reference data used in the predictive coding of said compressed data.

4. A method according to claim 2, wherein said classifying creates a group of selected spatial units which are useful for the decoding of said compressed data corresponding to the target spatial region; a group of selected spatial units which are not useful for the decoding of said compressed data corresponding to the target spatial region; and a group of non-selected spatial units which are useful for the decoding of said compressed data corresponding to the target spatial region.

5. A method according to claim 2, wherein said selection spatial region is defined by a set of sides, and the classifying of a spatial unit leads to the updating of at least one parameter for moving a side of the selection spatial region.

6. A method according to claim 5, wherein said updating information comprises the parameters for movement relative to each side of the selection spatial region.

7. A method according to claim 1, comprising the steps of:
storing the obtained compressed data;
identifying spatial units that are non-selected and useful for the decoding of said compressed data corresponding to the target spatial region, so as to form said transmitted updating information;
providing corrections to said decoding of the compressed data corresponding to the target spatial region to compensate for the absence of the identified spatial units in order to display a decoded version of said compressed data;
requesting and receiving, from said remote server, said identified spatial units; and
updating the stored compressed data using said received identified spatial units.

8. A method according to claim 1, in which said updating information depends on at least one spatial unit that is not selected and is useful for the decoding of said compressed data corresponding to the target spatial region.

9. A method according to claim 1, in which said updating information depends on at least one spatial unit that is selected and not useful for the decoding of said compressed data corresponding to the target spatial region.

10. A method according to claim 1, wherein said updating information depends on an average estimation of movement of the target spatial region between two images.

11. The method according to claim 1, wherein the updating information depends on a spatial unit comprising reference data used in predictive coding of the compressed data.

12. A device for accessing a spatio-temporal part of a video sequence of image compressed using a coding format implementing a spatial-unit-based prediction, comprising, at a client terminal of a communication network, the steps of:
a means for defining a target spatial region corresponding to said spatio-temporal part to access;
a means for obtaining compressed data corresponding to a selection spatial region in at least one first image of the video sequence, said selection spatial region including said target spatial region;
a means for decoding the compressed data corresponding to the selection spatial region in the first image to obtain a decoded part of the first image corresponding to the target spatial region in the first image;
a means for identifying, based on said decoding step, spatial unit or units missing in the compressed data to decode the whole target spatial region in the first image, and projecting the location of the missing spatial unit or units on the same image;
a means for identifying, based on said decoding step, non-useful spatial unit or units of the compressed data that are not used to obtain the decoded part corresponding to the target spatial region in the first image;
a means for generating, based on the identified missing and non-useful spatial unit or units, at least one item of updating information for updating the selection spatial region before it is used for at least one next image of the video sequence, the item of updating information being configured to add the projected missing spatial unit or units to the selection spatial region and to delete the identified non-useful spatial unit or units from the selection spatial region;
a means for transmitting the item of updating information to a remote server storing the compressed video sequence, for the client terminal to obtain next compressed data corresponding to the updated selection spatial region in the next image of the video sequence.

13. A non-transitory storage medium storing a computer-executable program causing a computer to implement a method of accessing a spatio-temporal part of a video sequence of images compressed using a coding format implementing a spatial-unit-based prediction, the method comprising, at a client terminal of a communication network, the steps of:
a step of defining a target spatial region corresponding to said spatio-temporal part to access, and further comprising the steps of:
obtaining compressed data corresponding to a selection spatial region in at least one first image of the video sequence, said selection spatial region including said target spatial region;
decoding the compressed data corresponding to the selection spatial region in the first image to obtain a decoded part of the first image corresponding to the target spatial region in the first image;
identifying, based on said decoding step, spatial unit or units missing in the compressed data to decode the whole target spatial region in the first image, and projecting the location of the missing spatial unit or units on the same image;
identifying, based on said decoding step, non-useful spatial unit or units of the compressed data that are not used to obtain the decoded part corresponding to the target spatial region in the first image;
generating, based on the identified missing and non-useful spatial unit or units, at least one item of updating information for updating the selection spatial region before it is used for at least one next image of the video sequence, the item of updating information being configured to add the projected missing spatial unit or units to the selection spatial region and to delete the identified non-useful spatial unit or units from the selection spatial region;
transmitting the item of updating information to a remote server storing the compressed video sequence, for the client terminal to obtain next compressed data corresponding to the updated selection spatial region in the next image of the video sequence.

14. A method of accessing a spatio-temporal part of a video sequence of images compressed using a coding format implementing a spatial-unit based prediction, the method comprising, at a server device of a communication network, the steps of:
receiving, from a remote client terminal, a request for access to said spatio-temporal part;
defining a target spatial region corresponding to said spatio-temporal part identified in said request;
obtaining compressed data corresponding to a selection spatial region in at least one first image of the video sequence, said selection spatial region including said target spatial region;
sending the obtained compressed data to the remote client terminal;
receiving, from the remote client terminal, at least one item of updating information for updating the selection spatial region based on the decoding of the compressed data so obtained which correspond to said target spatial region;
identifying, based on the item of updating information, spatial unit or units missing in the sent compressed data to decode the whole target spatial region in the first image, and projecting the location of the missing spatial unit or units on the same image;

identifying, based on the item of updating information, non-useful spatial unit or units of the compressed data that are not used to obtain the decoded part corresponding to the target spatial region in the first image;

updating the selection spatial region before it is used for at least one next image of the video sequence, where the updating adds the projected missing spatial unit or units to the selection spatial region and deletes the identified non-useful spatial unit or units from the selection spatial region;

obtaining next compressed data corresponding to the updated selection spatial region in the next image of the video sequence; and sending the obtained next compressed data to the remote client terminal.

15. A method according to claim 14, comprising a step of storing, by the server device, a processing history of a plurality of access requests, said updating of the selection spatial region for a later access request depending on said history.

16. A method according to claim 14, wherein said obtainment of the compressed data comprises selecting compressed data corresponding to a group of several images, and the updating information depends on the decoding of the compressed data obtained in those several images.

17. A method according to claim 16, wherein the selection of the compressed data corresponding to an image of said group of images comprises the steps of:

adjusting the dimensions of the selection spatial region depending on the type of image concerned; and selecting the compressed data corresponding to said image, which are included in said adjusted selection spatial region.

18. A method according to claim 14, in which said updating information depends on at least one spatial unit that is not selected and is useful for the decoding of said compressed data corresponding to the target spatial region.

19. A method according to claim 14, in which said updating information depends on at least one spatial unit that is selected and not useful for the decoding of said compressed data corresponding to the target spatial region.

20. A method according to claim 14, comprising a step of updating said selection spatial region, said updating consisting in identifying a spatial region encompassing a set of non-selected spatial units which are useful for the coding of said compressed data corresponding to the target spatial region.

21. A method according to claim 14, comprising a step of updating said selection spatial region, said updating comprising a step of reducing said selection spatial region on the basis of an item of congestion information relative to a communication network on which said obtained compressed data are transmitted.

22. A method according to claim 14, wherein said updating information depends on an average estimation of movement of the target spatial region between two images.

23. The method according to claim 14, wherein the updating information depends on a spatial unit comprising reference data used in predictive coding of the compressed data.

* * * * *